(12) United States Patent
Fukuoka et al.

(10) Patent No.: US 11,506,160 B2
(45) Date of Patent: Nov. 22, 2022

(54) FUEL SUPPLY DEVICE

(71) Applicant: AISAN KOGYO KABUSHIKI KAISHA, Obu (JP)

(72) Inventors: Shingo Fukuoka, Kariya (JP); Kenji Okabe, Kariya (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 0 days.

(21) Appl. No.: 17/161,965

(22) Filed: Jan. 29, 2021

(65) Prior Publication Data
US 2021/0146773 A1 May 20, 2021

Related U.S. Application Data

(63) Continuation of application No. PCT/JP2019/029454, filed on Jul. 26, 2019.

(30) Foreign Application Priority Data

Aug. 1, 2018 (JP) .............................. JP2018-144727

(51) Int. Cl.
*F02M 37/10* (2006.01)
*B60K 15/03* (2006.01)
*F04B 53/00* (2006.01)
*F04D 29/66* (2006.01)
*F04D 13/06* (2006.01)

(52) U.S. Cl.
CPC ........... *F02M 37/106* (2013.01); *B60K 15/03* (2013.01); *F04B 53/003* (2013.01); *F04D 13/06* (2013.01); *F04D 29/669* (2013.01); *B60K 2015/03105* (2013.01); *B60K 2015/03243* (2013.01)

(58) Field of Classification Search
CPC ........ F02M 37/106; B60K 2015/03105; F04D 29/669; F04B 53/003
See application file for complete search history.

(56) References Cited

U.S. PATENT DOCUMENTS

| 2005/0058556 | A1 | 3/2005 | Cremer et al. |
| 2012/0063938 | A1* | 3/2012 | Okazono ............... F02M 37/106 417/437 |
| 2012/0199223 | A1 | 8/2012 | Beyer et al. |
| 2013/0160877 | A1 | 6/2013 | Walter et al. |
| 2014/0053814 | A1* | 2/2014 | Fisher .................... F02M 39/02 123/497 |
| 2015/0240764 | A1 | 8/2015 | Walter et al. |
| 2017/0260943 | A1 | 9/2017 | Hayashi et al. |
| 2017/0306906 | A1 | 10/2017 | Takahashi |

FOREIGN PATENT DOCUMENTS

| EP | 0 728 937 | 8/1996 |
| JP | 2017-141837 | 8/2017 |

* cited by examiner

*Primary Examiner* — Atif H Chaudry
(74) *Attorney, Agent, or Firm* — Nixon & Vanderhye P.C.

(57) ABSTRACT

A fuel supply device includes: a sub-tank to be fixed on a bottom of a fuel tank, the sub-tank temporarily storing fuel in the fuel tank, an upper side of the sub-tank having an opening; a bracket attached to an opening side of the sub-tank; an electric pump that pumps up the fuel in the sub-tank and supplies the fuel to outside of the sub-tank; and multiple fitting portions arranged on an outer edge of the bracket and to fix the bracket to the sub-tank by being fitted to a plurality of receiving portions arranged on the opening of the sub-tank.

5 Claims, 23 Drawing Sheets

100
FUEL SUPPLY DEVICE

CROSS REFERENCE TO RELATED APPLICATION

The present application is a continuation application of International Patent Application No. PCT/JP2019/029454 filed on Jul. 26, 2019, which designated the U.S. and claims the benefit of priority from Japanese Patent Applications No. 2018-144727 filed on Aug. 1, 2018. The entire disclosures of all of the above applications are incorporated herein by reference.

TECHNICAL FIELD

The present disclosure relates to a fuel supply device arranged in a fuel tank and configured to supply fuel stored in the fuel tank to an outside.

BACKGROUND

A known fuel supply device is arranged in a fuel tank and supplies fuel to an external device such as an internal combustion engine after the fuel in the fuel tank is temporally stored in a sub-tank.

SUMMARY

According to the present disclosure, a fuel supply device includes: a sub-tank to be fixed on a bottom of a fuel tank, the sub-tank temporarily storing fuel in the fuel tank, an upper side of the sub-tank having an opening; a bracket attached to an opening side of the sub-tank; an electric pump that pumps up the fuel in the sub-tank and supplies the fuel to an outside of the sub-tank; and multiple fitting portions arranged on an outer edge of the bracket and to fix the bracket to the sub-tank by being fitted to multiple receiving portions arranged on the opening of the sub-tank. The bracket has a lid covering the opening with a predetermined separation distance from the opening of the sub-tank when the bracket is attached to the opening of the sub-tank, a fixing portion that fixes the electric pump, and multiple damping portions having predetermined damping characteristics. The damping portion being provided between the fixing portion and the fitting portion.

DETAILED DESCRIPTION

A fuel supply device may be arranged in a fuel tank and supplies fuel to an external device such as an internal combustion engine after the fuel in the fuel tank is temporally stored in a sub-tank. The sub-tank is arranged to supply the fuel to the outside stably, even when the fuel in the fuel tank is unevenly distributed because of the low level of the fuel, an inclination of the fuel tank, or the like. Therefore, the sub-tank is generally fixed to a bottom of the fuel tank.

However, in the fuel supply device described above, an oscillation of a pump which supplies the fuel to the outside is transmitted through the sub-tank fixed to the bottom of the fuel tank and is recognized by an occupant as noise. The transmission of the oscillation affects silence of an apparatus such as a vehicle which equips the fuel tank.

According to an exemplar embodiment of the present disclosure, a fuel supply device is arranged on a bottom of a fuel tank. The fuel supply device includes: a sub-tank to be fixed on the bottom of the fuel tank, the sub-tank temporarily storing fuel in the fuel tank, an upper side of the sub-tank having an opening; a bracket attached to an opening side of the sub-tank; an electric pump that pumps up the fuel in the sub-tank and supplies the fuel to an outside of the sub-tank; and multiple fitting portions arranged on an outer edge of the bracket and to fix the bracket to the sub-tank by being fitted to multiple receiving portions arranged on the opening of the sub-tank. The bracket has a lid covering the opening with a predetermined separation distance from the opening of the sub-tank when the bracket is attached to the opening of the sub-tank, a fixing portion that fixes the electric pump, and multiple damping portions having predetermined damping characteristics. The damping portion being provided between the fixing portion and the fitting portion.

In the fuel supply device according to the exemplar embodiment described above, an oscillation of the electric pump is damped by the damping portion and restricted from being transmitted to the sub-tank through the fitting portion. In addition, the sub-tank is separated from the lid by a predetermined separation distance. Therefore, the oscillation of the electric pump is restrained from being transmitted to the sub-tank through the lid.

A. First Embodiment

Figure 1:
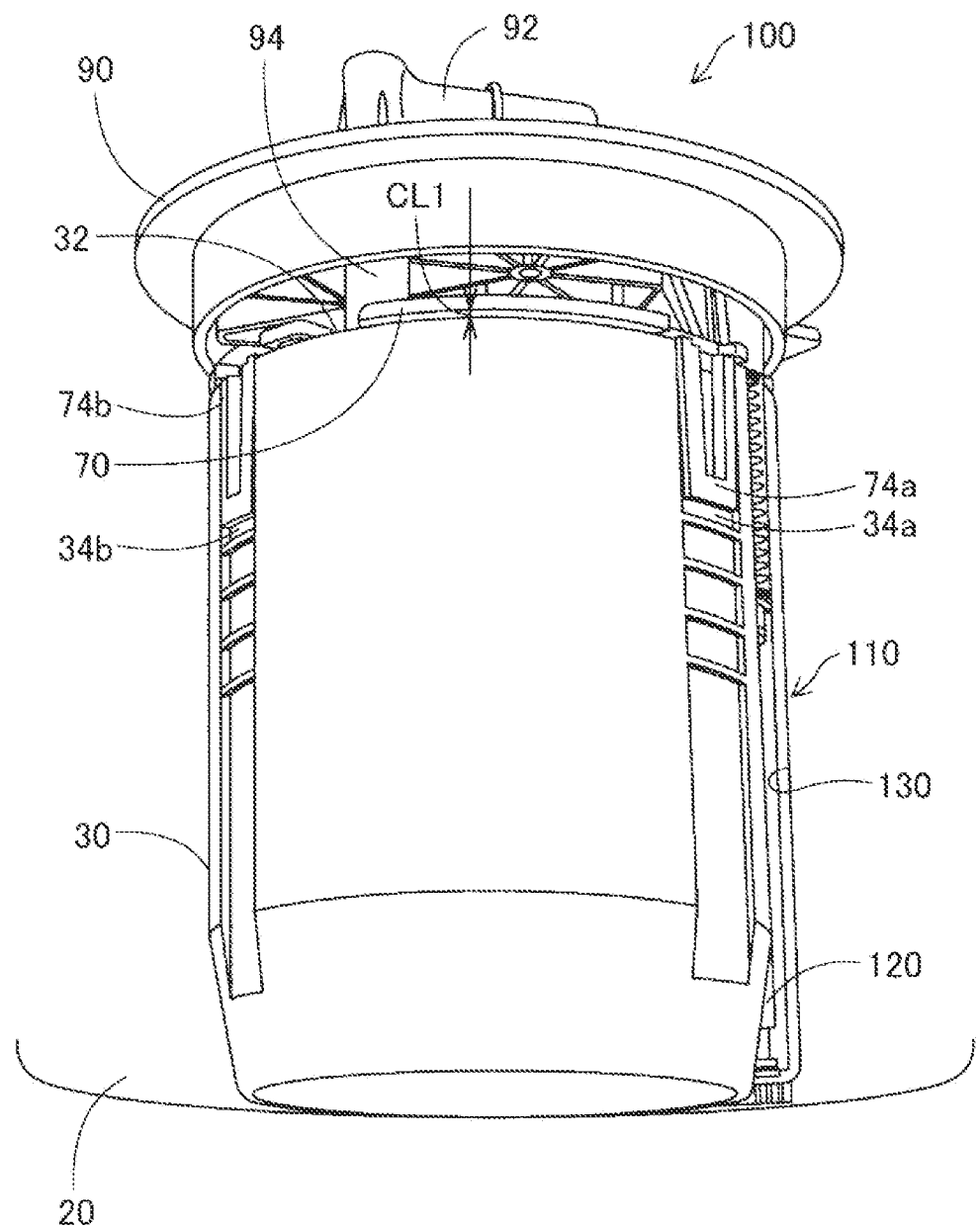
FIG. 1 is a perspective view showing an appearance of a fuel supply device.

A fuel supply device 100 shown in FIG. 1 in a first embodiment includes a sub-tank 30, a bracket 70, and a lid member 90. The sub-tank 30 is fixed on a bottom of a fuel tank 20. The bracket 70 is attached to an opening at an upper side of the sub-tank 30. The lid member 90 is attached to an unillustrated opening of the fuel tank 20. The sub-tank 30 is configured to temporarily store fuel in the fuel tank 20 and houses a pump assembly 40 which supplies the fuel in the sub-tank 30 to an unillustrated internal combustion engine.

Figure 2:
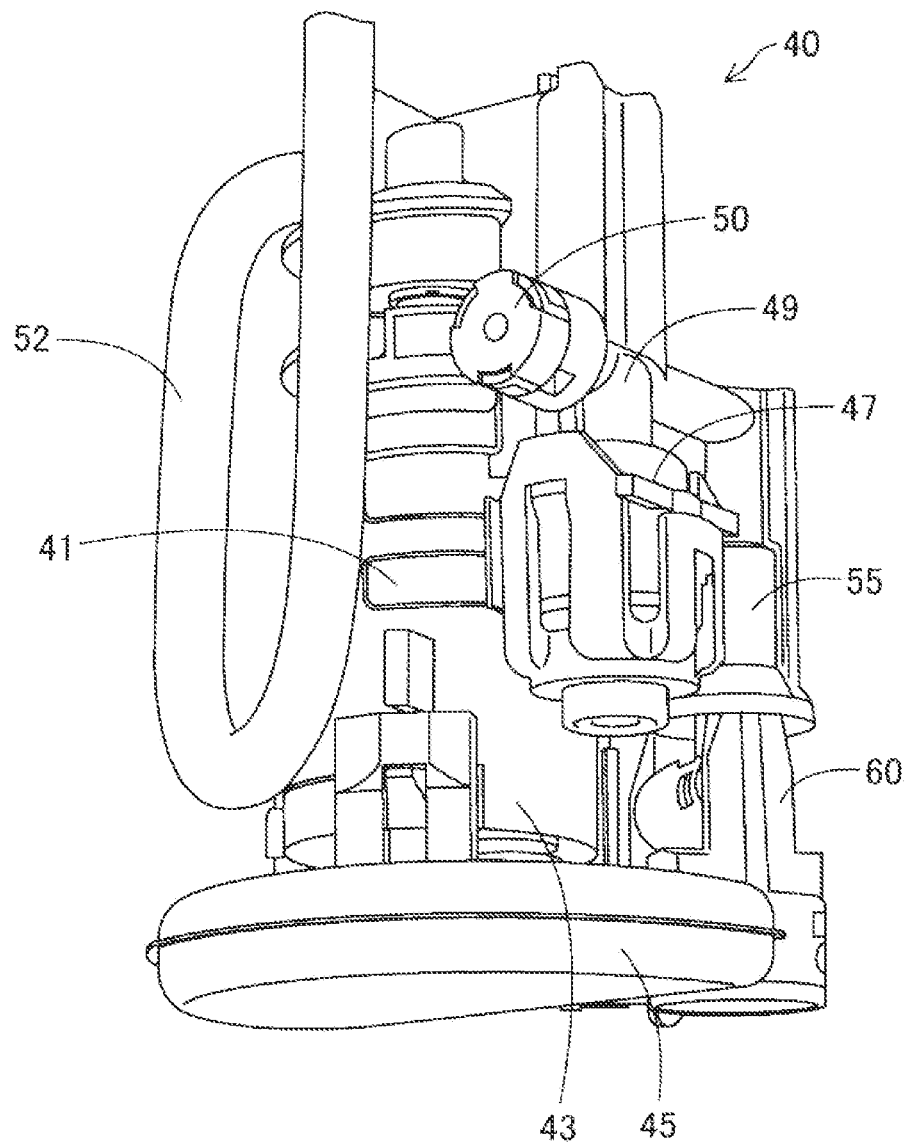
FIG. 2 is a perspective view showing an appearance of a pump assembly housed in a sub-tank.
Figure 3:
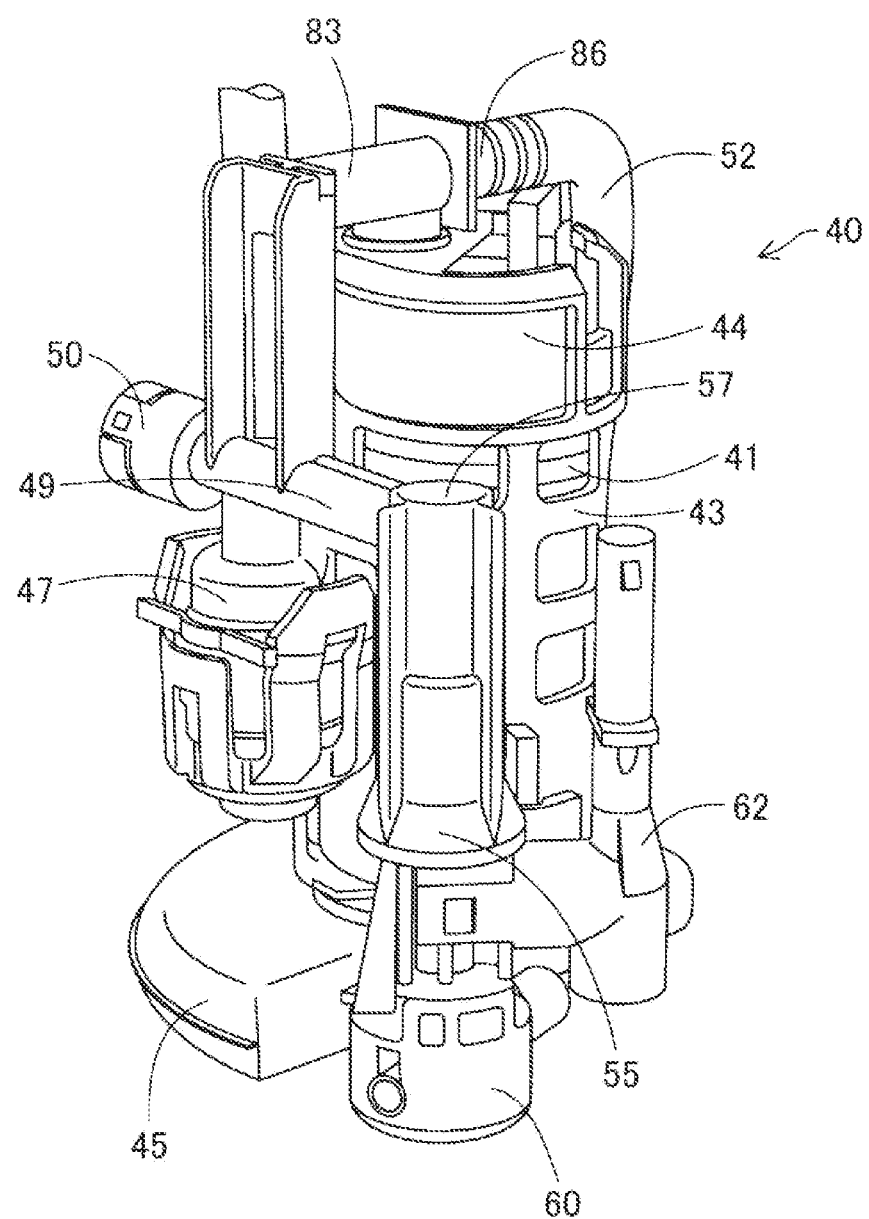
FIG. 3 is a perspective view showing an appearance of the pump assembly viewed from an opposite side of a view shown in FIG. 2.

As shown in FIGS. 2 and 3, the pump assembly 40 includes an electric pump 41, a storage body 43, an integrated filter 45, a regulator 47, a relief valve 50, a flexible tube 52, a connection part 55, and the like. The electric pump 41 is driven by a motor. The storage body 43 houses the electric pump 41. The integrated filter 45 is attached to a bottom of the electric pump 41. The regulator 47 is configured to control a pressure of the fuel pressurized and fed by the electric pump 41. The relief valve 50 is arranged in a fuel passage 49 in which a pressure is controlled. The flexible tube 52 guides the fuel to a discharge port 92 of the lid member 90. The connection part 55 is connected to a suction jet pump 60 arranged separately and configured to pump up the fuel to the sub-tank 30

The electric pump 41 is fixed to the bracket 70 unillustrated in FIG. 2, and the flexible tube 52 is connected to the lid member 90. In this state, the pump assembly 40 is inserted from an upper opening portion 32 of the sub-tank 30. After that, fitting portions 74a, 74b, 74c of the bracket 70 are fitted to receiving portions 34a, 34b, 34c (the receiving portion 34c is unillustrated in the drawings) provided on an upper end of the sub-tank 30, to fix the pump assembly 40. At this point, the connection part 55 of the pump assembly 40 is connected to the suction jet pump 60 arranged on a bottom of the sub-tank 30 from an upper side. The attachment relationship will be described in more detail below. In addition, the structure of the bracket 70 will be described in more detail below.

Figure 4:
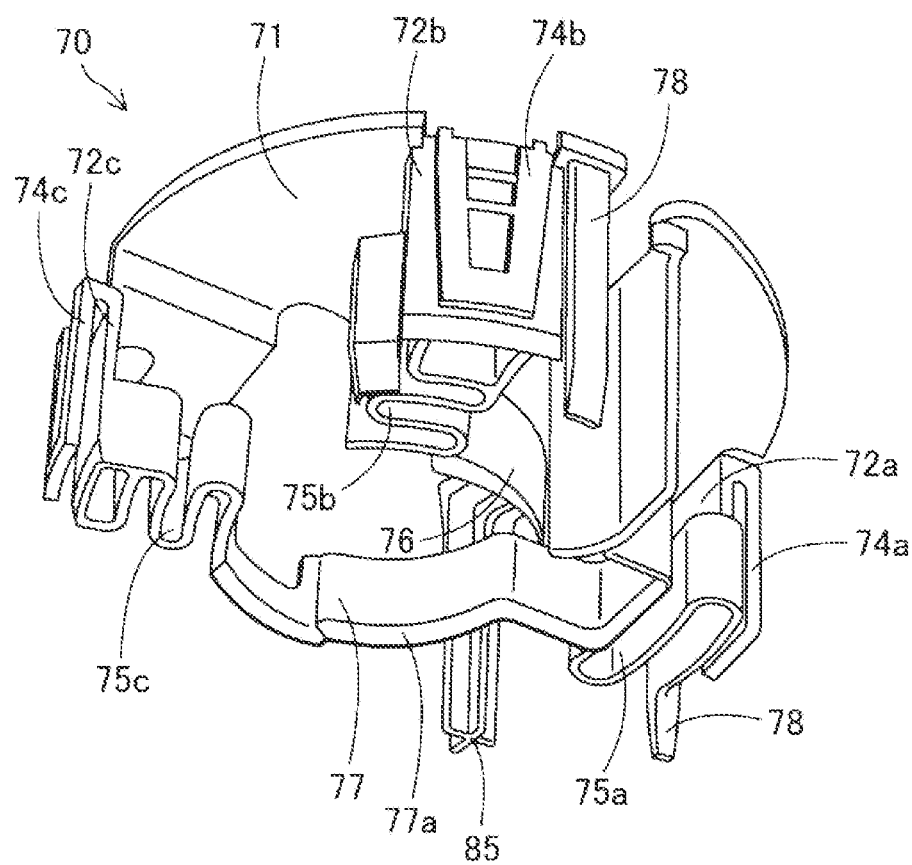
FIG. 4 is a perspective view showing an outer shape of a bracket viewed from below.
Figure 5A:
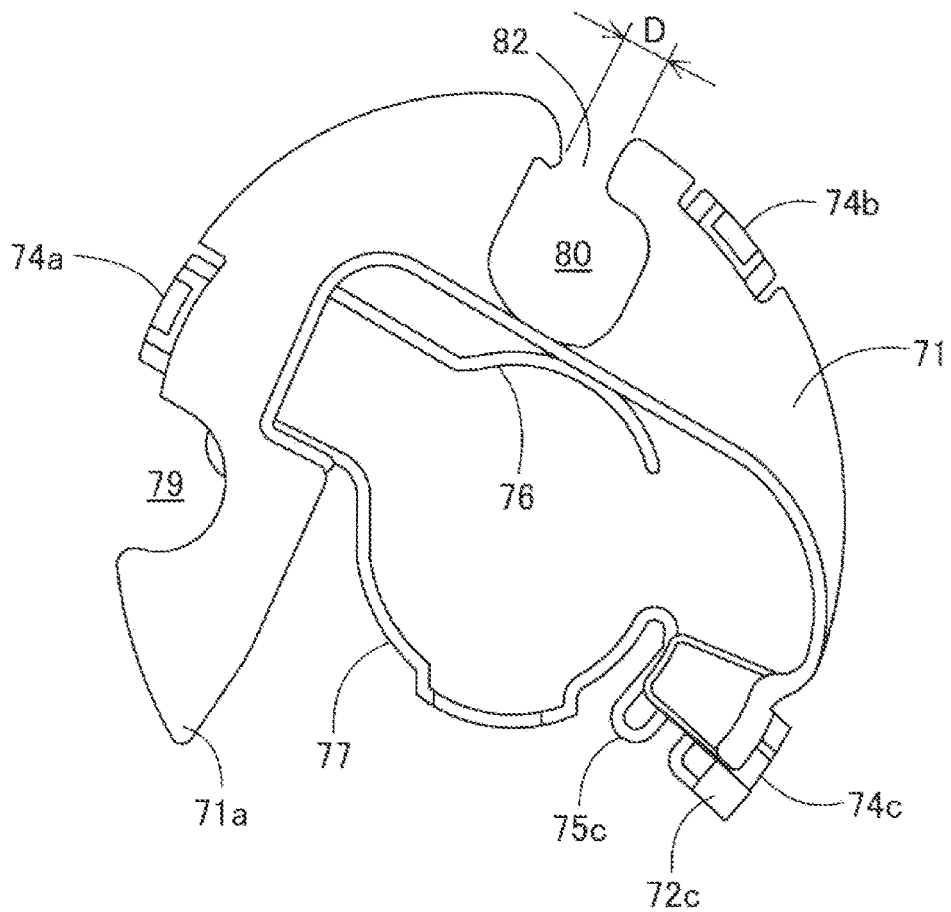
FIG. 5A is a top view showing the bracket.
Figure 5B:
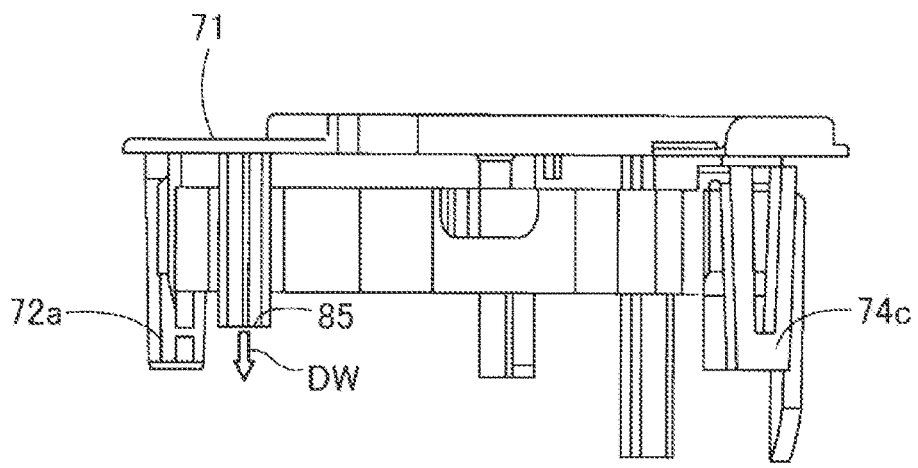
FIG. 5B is a side view showing the bracket.
Figure 5C:
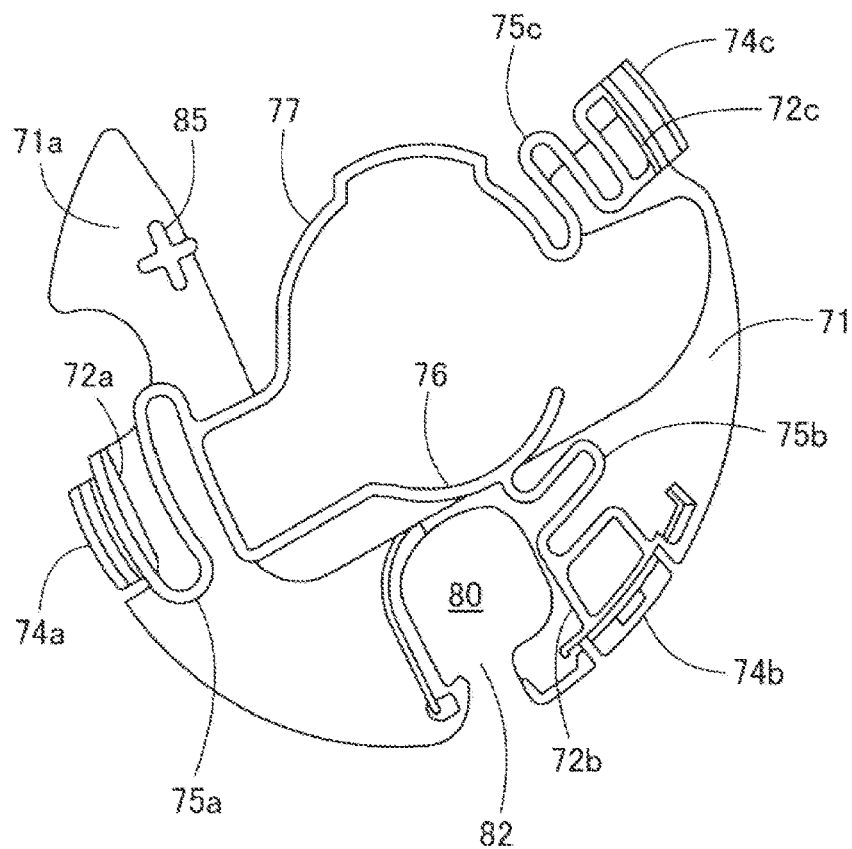
FIG. 5C is a bottom view showing the bracket.

The bracket 70 shown in FIG. 4 is made of resin and formed integrally to include a lid 71, raised portions 72a, 72b, 72c, damping portions 75a, 75b, 75c, and holding arms 76, 77. The lid 71 is a base of a whole structure of the bracket 70. The raised portions 72a, 72b, 72c project from the lid 71 at three positions respectively. The damping portions 75a, 75b, 75c extend from the raised portions 72a, 72b, 72c toward a central axis of the lid 71, respectively to be parallel to the lid 71. The holding arms 76, 77 are branched from the damping portion 75a at an inner side in two directions and extend to the damping portions 75b, 75c, respectively. The fitting portion 74a, 74b, 74c is arranged on the outer side of the raised portion 72a, 72b, 72c in the radial direction. The fitting portions 74a, 74b, 74c and the raised portions 72a, 72b, 72c hold the upper opening portion 32 of the sub-tank 30, and the bracket 70 is fixed, as described below. The structure described above is shown in FIG. 5A showing a top view of the bracket 70, FIG. 5B showing a side view of the bracket 70, and FIG. 5C showing a bottom view of the bracket 70. The lid 71 has a shape in which a center is hollowed largely. As shown in FIG. 5A, the lid 71 does not exist above an area surrounded by the holding arms 76, 77, and a space is provided. In addition, tapered portions 76a, 77a are provided at lower ends of the holding arms 76, 77, respectively (only the tapered portion 77a is shown in FIG. 4). Due to this, when the electric pump 41, shown in FIGS. 2 and 3, is inserted from a lower side to an area between the holding arms 76, 77 opposed to each other, an upper end of a holder portion 44 provided at an upper side of the electric pump 41 hits the tapered portion 76a, 77a of the holding arm 76, 77. When the electric pump 41 is pushed further upward, the holding arms 76, 77 are elastically deformed outward and expanded. After that, when the electric pump 41 is further pushed upward, the shape of the holding arm 76, 77 returns to the original shape after the holding arm 76, 77 gets over the upper end of the holder portion 44. Because of this, the electric pump 41 is pinched and fixed. In this embodiment, the holder portion 44 of the electric pump 41 is held and fixed by the holding arms 76, 77 at a side surface of the holder portion 44 by assembling in a vertical direction. A passage 83 is arranged above the electric pump 41 and positioned in the space defined in the lid 71 not to interfere with the lid 71.

Figure 6:
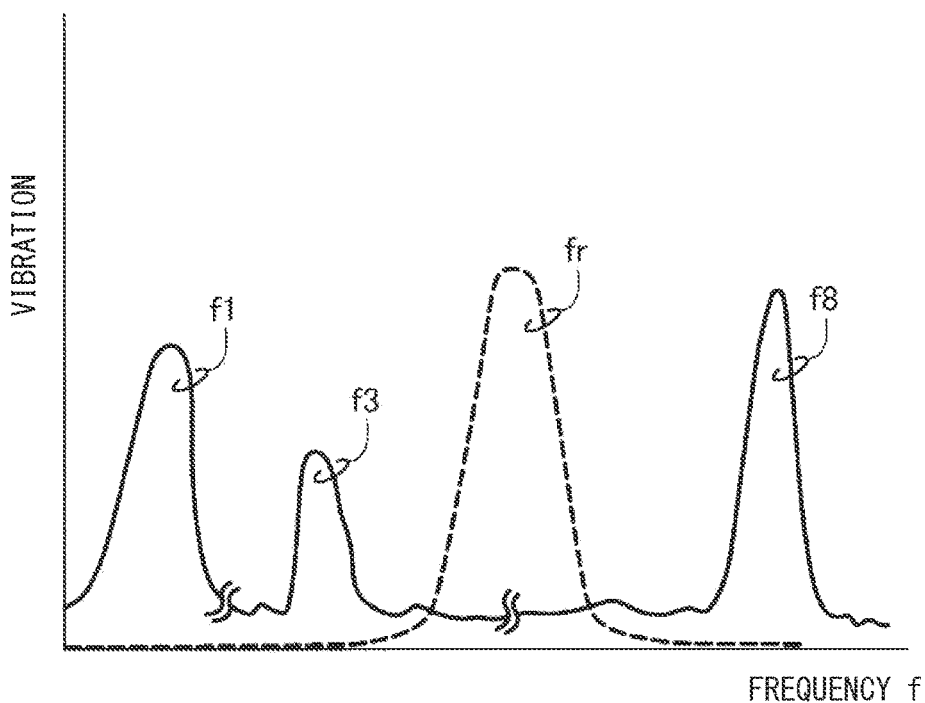
FIG. 6 is a graph showing a relationship between primary, third, and eighth oscillation frequencies of an electric pump and resonance frequencies of a component which fixes the electric pump by a flange.

As a result, the electric pump 41 is suspended from the fitting portions 74a, 74b, 74c through the damping portions 75a, 75b, 75c. As illustrated, the damping portion 75a, 75b, 75c is folded once or twice depending on a position to hold the electric pump 41 softly. As shown in FIG. 6, damping characteristics of the damping portions 75a, 75b, 75c are set respectively such that a resonance frequency fr of the whole component suspended by the holding arms 76, 77 through the damping portions 75a, 75b, 75c is between a first oscillation frequency f1 and an eighth oscillation frequency f8, and between a third oscillation frequency f3 and the eighth oscillation frequency f8. The oscillation frequencies f1, f3, f8 are accompanied by rotations of the electric pump 41. The resonance frequency of the whole component is measured at the bottom of the sub-tank 30. Therefore, the resonance caused by an overlap of the oscillation accompanied by a motor rotation of the electric pump 41 and the resonance frequency of a component to fix the electric pump 41 is restricted. Multiple types of the motor are used in the electric pump 41 in accordance with a rated value of the fuel supply device 100, that is, a fuel supply amount or pressure.

Regardless of the motor type, it is preferable that the resonance frequency fr is not overlapped with the first oscillation frequency f1, the third oscillation frequency f3, or the eighth oscillation frequency f8, as shown in FIG. 6. If the resonance frequency fr is overlapped with the first oscillation frequency f1, the third oscillation frequency f3, or the eighth oscillation frequency f8 by using the electric pump 41 which has a different rated value, the resonance frequency may be changed by changing a characteristic of the damping portion 75a, 75b, 75c such as hardness of material, a width of a folded part, a height of the folded part, a thickness of the folded part, the number of the folded part, or the like.

The lid 71 includes an opening 80 in addition to the structure described above. The opening 80 includes a notch 82 which extends outward from the opening 80. An internal diameter of the opening 80 is larger than an external diameter of the flexible tube 52 shown in FIG. 2. On the other hand, a width D of the notch 82 is slightly smaller than the external diameter of the flexible tube 52. That is, after the flexible tube 52 is positioned in the opening 80 by being deformed and passing through the notch 82, the flexible tube 52 does not pass through the notch 82 due to the self-weight of the flexible tube 52. In addition, one end of the flexible tube 52 is fixed to a discharge port 86 (see FIG. 3) of the electric pump 41, and the other end is fixed to an inlet 94 of the lid 71 communicated to the discharge port 92. Since the flexible tube 52 is positioned in the opening 80, the flexible tube 52 does not protrude from the lid 71, and the handling is facilitated. In addition, only deformation of the flexible tube 52 by small external force is required to remove the flexible tube 52 from the lid 71. The flexible tube 52 may be a corrugated tube. If the relationship in a crest diameter of the corrugated tube, a root diameter of the corrugated tube, and the width D of the notch 82 is suitable, even when the flexibility of the corrugated tube is low, the corrugated tube can be inserted into the opening 80 and be removed from the opening 80 easily as described above. In some case, suitable relationship of a thickness of the lid 71 is also required in addition to the above to insert the corrugated tube into the opening 80 or remove from the opening 80.

The lid 71 includes a protrusion 85. As shown in FIG. 5C, the lid 71 is the most deformable around the protrusion 85 that is located one-sided in the lid 71 made of resin. This most deformable part of the lid 71 is referred to a deformation portion 71a. When the deformation portion 71a of the lid 71 is deformed downward, the protrusion 85 is enabled to move downward similarly, as shown by an arrow DW in FIG. 5B. When the pump assembly 40 is attached to the sub-tank 30, the connection part 55 of the pump assembly 40 is joined to the suction jet pump 60 securely by the structure described above. This will be described below.

Figure 7:
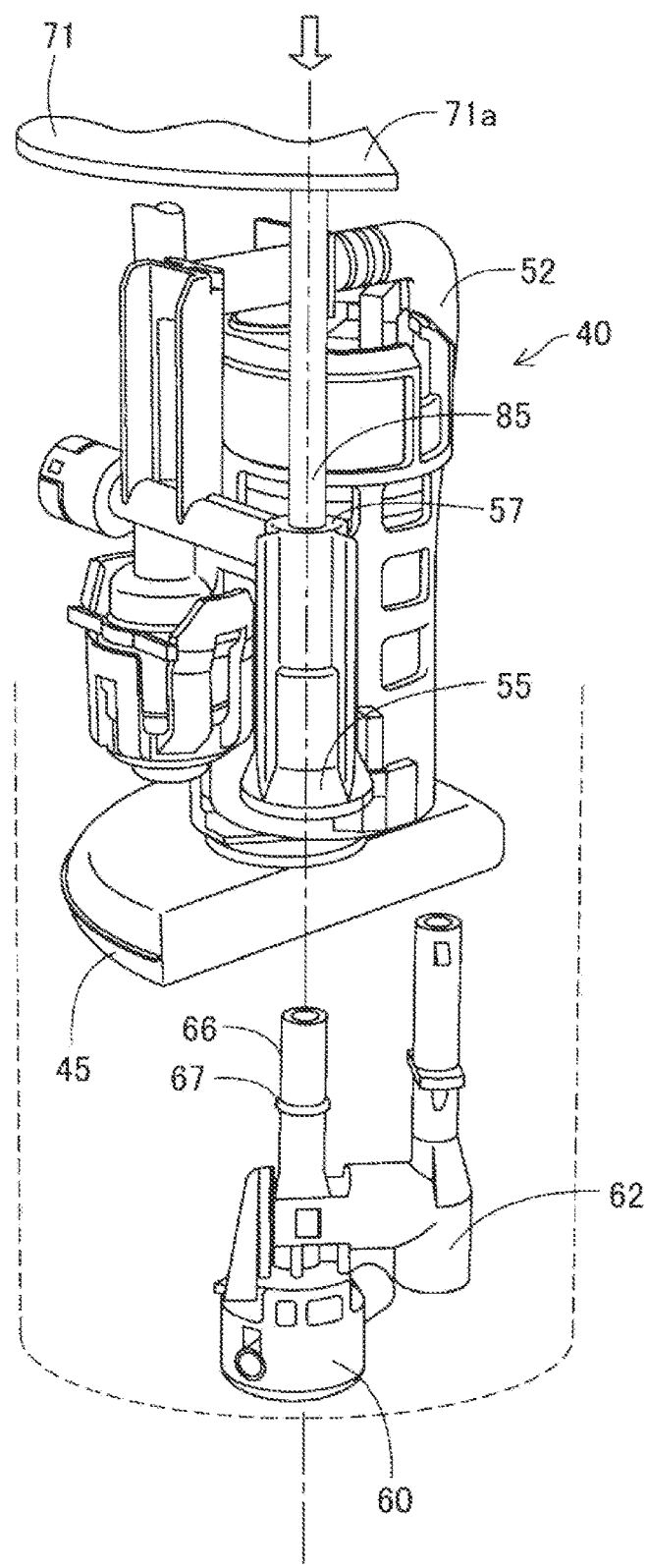
FIG. 7 is an explanatory view showing an assembly of the pump assembly to a suction jet pump when the pump assembly is housed in the sub-tank.
Figure 8:
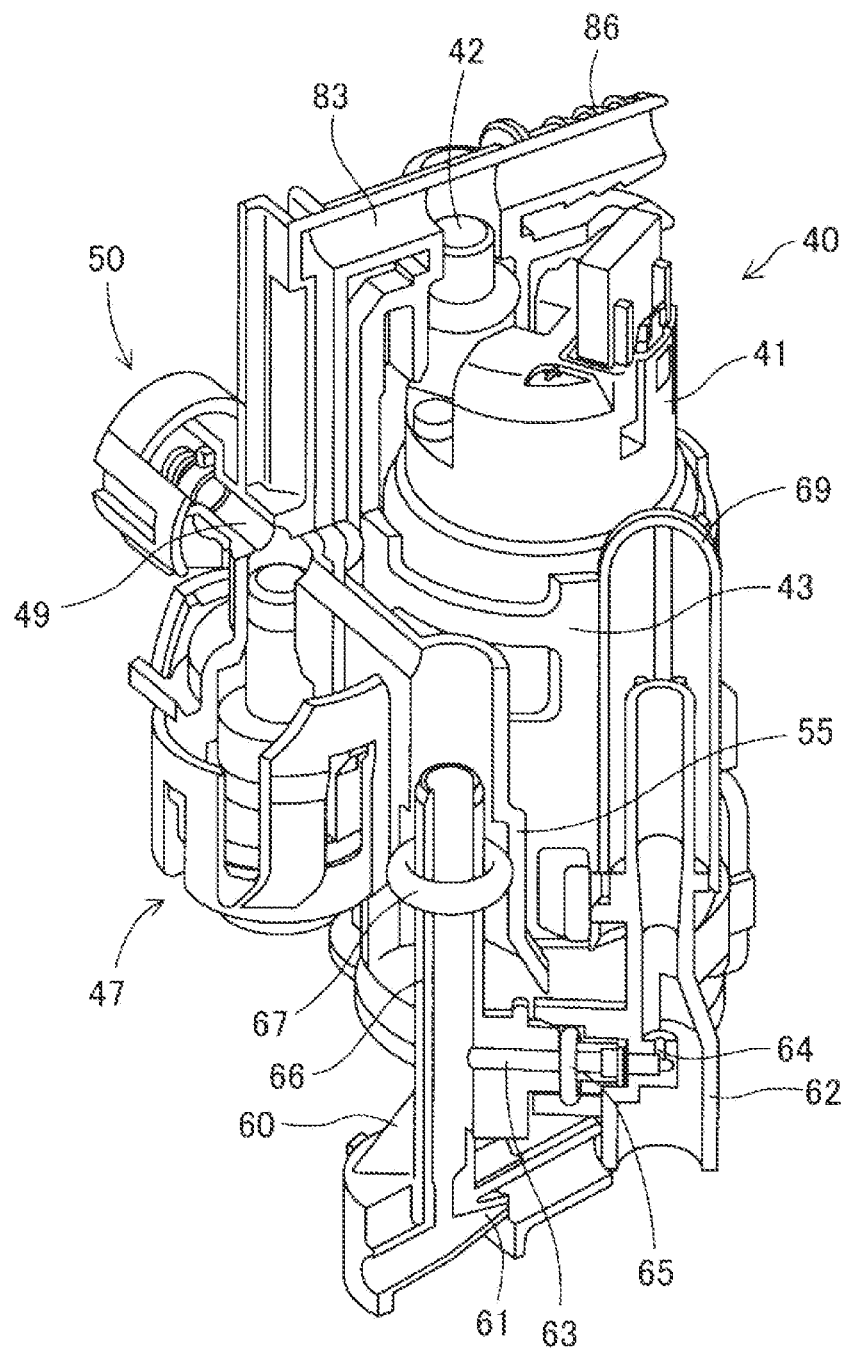
FIG. 8 is an explanatory view showing a passage from an outlet of the electric pump to the suction jet pump through a regulator.

The suction jet pump 60 is configured to pump up the fuel in the fuel tank 20 to the sub-tank 30 by using negative pressure and arranged at a predetermined position on the bottom of the sub-tank 30. As shown in FIGS. 7 and 8, a transfer jet pump 62 is assembled to a branch path 63 of the suction jet pump 60 which protrudes in a horizontal direction, and an internal passage is sealed by an O-ring 65. An O-ring 67 for sealing is provided on an outer peripheral surface of an inlet passage 66 through which the fuel is supplied to the suction jet pump 60.

After the suction jet pump 60 is placed at a predetermined position on the bottom of the sub-tank 30, the bracket 70 and the pump assembly 40 in an assembled state are housed into the sub-tank 30. At this point, when the bracket 70 becomes closer to the upper opening portion 32 of the sub-tank 30, a guide portion 78 of the bracket 70 provided in a vicinity of the fitting portion 74a to protrude downward below the fitting portion 74a is guided into a groove on the upper opening portion 32 of the sub-tank 30. Thus, an entire position of the bracket 70 relative to the sub-tank 30 is determined.

Figure 10A:
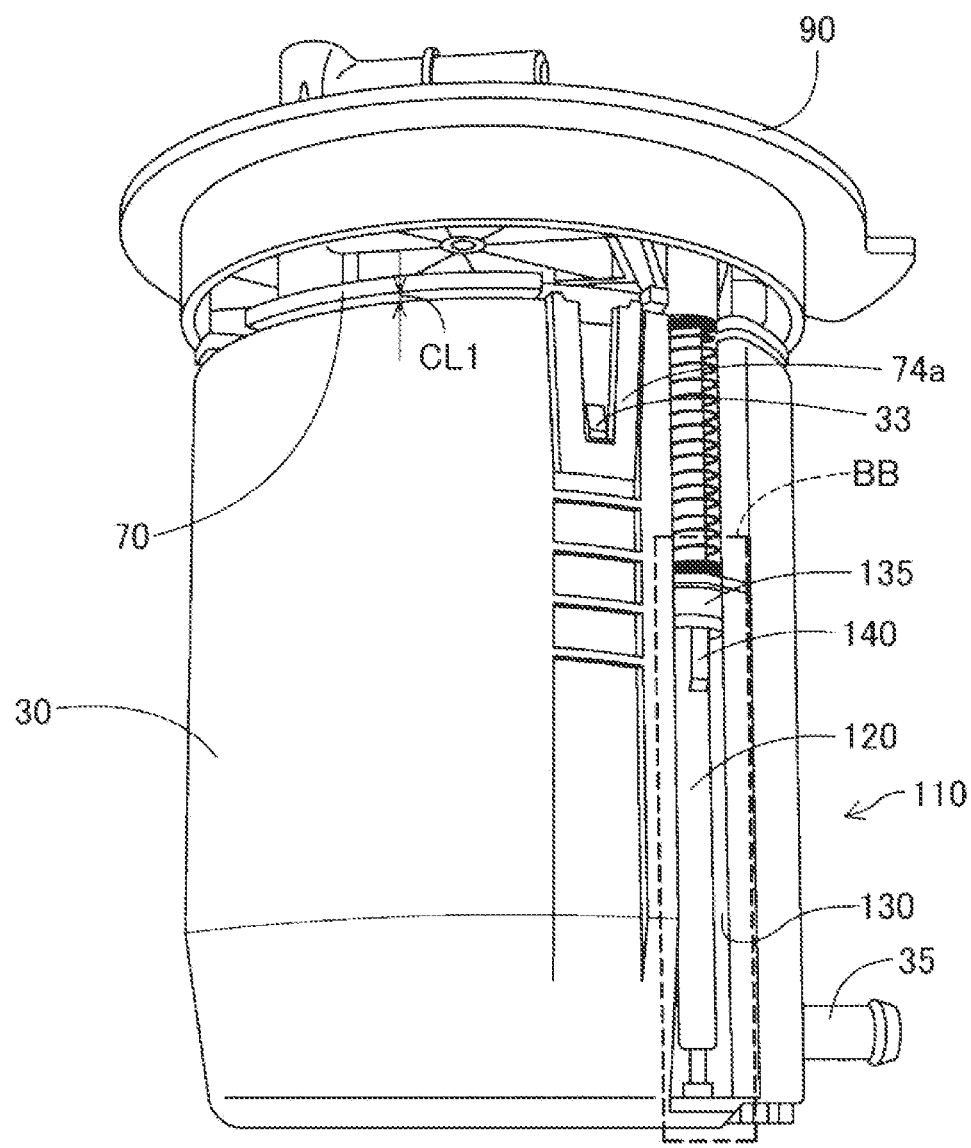
FIG. 10A is a perspective view showing a guide part assembled to the fuel supply device.

The fitting portions 74a, 74b, 74c of the bracket 70 at the three positions are fitted into the receiving portions 34a, 34b, 34c provided on the upper opening portion 32 of the sub-tank 30, respectively, while the bracket 70 is further housed into the sub-tank 30. Each of the receiving portions 34a, 34b, 34c includes a pawl 33 (as shown in FIG. 10A which will be described below). When the fitting portions 74a, 74b, 74c are respectively inserted into the receiving portions 34a, 34b, 34c, each of the fitting portions 74a, 74b, 74c is elastically deformed and gets over the pawl 33. Because of this, the fitting portion 74a, 74b, 74c is engaged with the pawl 33, and the bracket 70 is fixed to the upper opening portion 32 of the sub-tank 30. In this state, as described above, the lid 71 of the bracket 70 is separated from the upper opening portion 32 of the sub-tank 30 by a separation distance CL1. Therefore, the deformation portion 71a of the lid 71 which includes the protrusion 85 is enabled to be elastically deformed and to be pushed downward at least by the separation distance CL1. In addition, the deformation of the deformation portion 71a is regulated by the upper opening portion 32. Therefore, the deformation portion 71a is restricted from being deformed over elastic limit and is protected from a breakage. By pushing the deformation portion 71a downward, the protrusion 85 is moved downward, and an end of the protrusion 85 abuts against an abutting portion 57 provided on an upper surface of the connection part 55. Because of this, the inlet passage 66 of the suction jet pump 60 is fitted into an internal passage of the connection part 55 firmly, and sealability between the internal passage of the connection part 55 and the inlet passage 66 of the suction jet pump 60 is secured by the O-ring 67.

In this embodiment, the transfer jet pump 62 assembled to the suction jet pump 60 is installed from the upper side to the bottom of the sub-tank 30, and the pump assembly 40 is assembled to the sub-tank 30 from the upper side. Therefore, the assembly of the pump assembly 40 and the bracket 70 can be conducted in one direction (from the upper side, in this embodiment), and assembly process can be simplified. Furthermore, the suction jet pump 60 and the transfer jet pump 62 are not thermally welded, but connected only by the O-ring 65. Therefore, even when a position of the suction jet pump 60 or a position of the transfer jet pump 62 is shifted during the assembly, the shift can be absorbed, and the sealing performance at the passage can be secured. Furthermore, the suction jet pump 60 is produced separately from the other component. Because of this, die cutting in a manufacturing becomes easier. Further, a passage resistance becomes lower because the passage is formed in a cone shape. In addition, a sealing performance of a turning chamber in the suction jet pump 60 can be enhanced since the shape is formed by the die cutting.

The pump assembly 40 is housed in the sub-tank 30, and the fitting portions 74a, 74b, 74c on the bracket 70 are fitted in the receiving portions 34a, 34b, 34c of the sub-tank 30. In this state, as shown in FIG. 1, the lid 71 of the bracket 70 is separated from an upper end of the upper opening portion 32 by the separation distance CL1. Because of this, an oscillation of the electric pump 41 of the pump assembly 40 is not transmitted to the sub-tank 30 through the lid 71. The oscillation of the electric pump 41 is transmitted to the holding arms 76, 77 of the bracket 70, however, is dumped by the damping portion 75a, 75b, 75c. In addition, as described with reference to FIG. 6, the damping force is set to restrain resonance. Therefore, the oscillation of the electric pump 41 is hardly transmitted to the fitting portions 74a, 74b, 74c.

In addition, a clearance between the lid 71 and the upper opening portion 32 of the sub-tank 30 is set such that the separation distance CL1 is at least around 1 mm at a position of the bracket 70 where the lid 71 exists, in consideration of tolerance of each parts. That is, the lid 71 is not brought into contact to the upper opening portion 32 while is displaced to be close to the upper opening portion 32. Because of this, the oscillation of the electric pump 41 is not transmitted to the sub-tank 30 through the lid 71. In addition, a splash of the fuel in the sub-tank 30 due to a turn of a vehicle or the like is restricted. The sealing structure in a case of fuel oscillation, such as described above, is referred to as a dynamic seal. In this embodiment, a structure in which the oscillation is not transmitted to the sub-tank 30 through the lid 71 and the dynamic seal are performed by a simple structure.

Figure 9A:
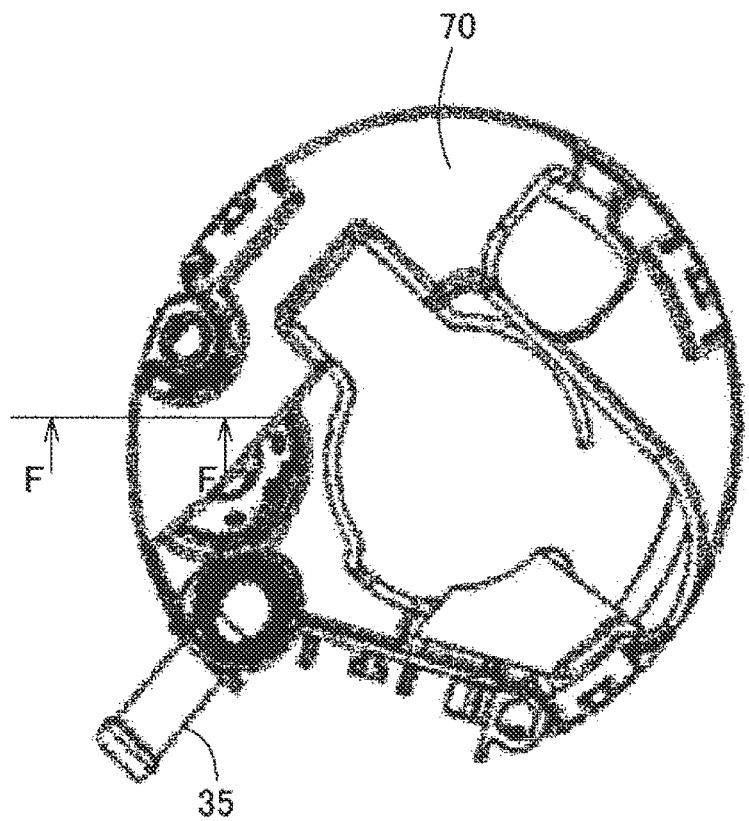
FIG. 9A is a top view showing the bracket assembled to the sub-tank.
Figure 9B:
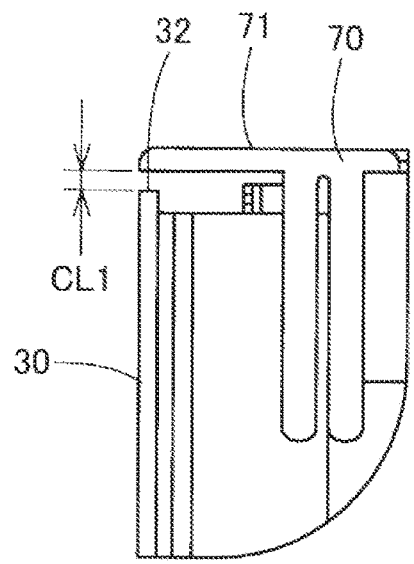
FIG. 9B is an explanatory view taken along a F-F line in FIG. 9A and showing a separation distance between a lid and the sub-tank.

The structure of the dynamic seal is not limited by the above embodiment and encompasses various variations. FIG. 9A is a top view viewed from the top of the fuel supply device 100 in a condition wherein the lid member 90 is not assembled. FIG. 9B shows a cross section taken along F-F line in FIG. 9A, in which the bracket 70 is attached to the upper opening portion 32 of the sub-tank 30. FIG. 9A shows the suction jet pump 60, the transfer jet pump 62, and a transfer pipe 35, while the pump assembly 40 is not shown for convenience of illustration. The suction jet pump 60 and the transfer jet pump 62 are provided on the bottom of the sub-tank 30. The transfer pipe 35 protrudes outward of the sub-tank 30.

In the embodiment described above, an outer shape of the lid 71 of the bracket 70 (reference to FIG. 5A) does not coincide completely with an outer shape of the upper opening portion 32 of the sub-tank 30. However, the outer shape of the lid 71 coincides with the outer shape of the upper opening portion 32 at a position in which the lid 71 exists. As shown in FIG. 9B, a radial edge of the outer shape of the lid 71 and a radial edge of the outer shape of the upper opening portion 32 of the sub-tank 30 are at same position. In addition, an undersurface of the lid 71 is separated from the upper end of the upper opening portion 32 by the separation distance CL1. Therefore, the transmission of the oscillation is restricted, and the dynamic seal is performed so as to restrict the splash of the fuel when the fuel is oscillated.

Figure 9C:
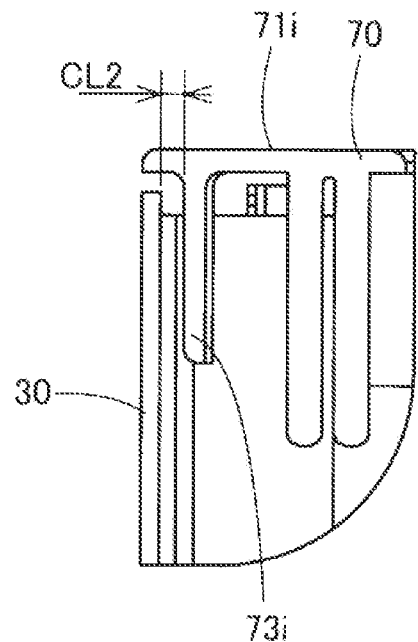
FIG. 9C is an explanatory view corresponding to the F-F line in FIG. 9A and showing a separation distance between a lid and a sub-tank in another configuration example.
Figure 9D:
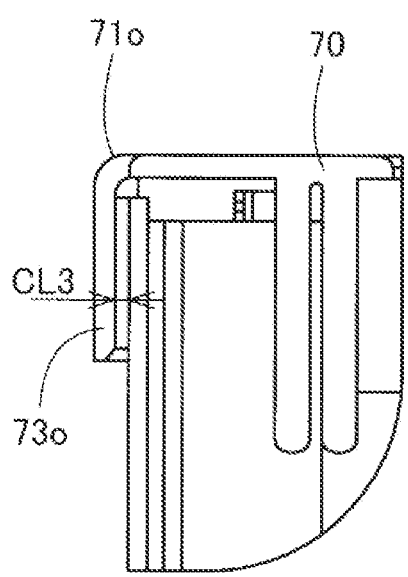
FIG. 9D is an explanatory view corresponding to the F-F line in FIG. 9A and showing a separation distance between a lid and a sub-tank in another configuration example.

Alternatively, the separation distance may be provided inside the sub-tank 30 as shown in FIG. 9C, or the separation distance may be provided outside the sub-tank 30 as shown in FIG. 9D. In an example shown in FIG. 9C, a lid 71i of the bracket 70 includes an inside wall 73i located inside of the sub-tank 30. The inside wall 73i is defined at an outer peripheral side of the lid 71i. The inside wall 73i protrudes downward in the sub-tank 30 when the bracket 70 is assembled to the sub-tank 30. An outer peripheral surface of the inside wall 73i is separated from an inner peripheral surface of the sub-tank 30 by a separation distance CL2. In this example, the upper opening portion 32 of the sub-tank 30 may be separated from an undersurface of the lid 71i by a distance larger than the separation distance CL2. In addition, an outer shape of the lid 71i may be positioned inside of the outer shape of the upper opening portion 32 of the sub-tank 30 in a radial direction. In this case, since the deformation of the deformation portion 71a is not regulated by the upper opening portion 32 when the protrusion 85a is pushed downward, the deformation amount can be increased. Even when the structure described above is adopted, the oscillation of the pump assembly 40 is restricted from being transmitted to the sub-tank 30 through the lid 71i, and the dynamic seal can be performed so as to restrict the splash of the fuel when the fuel is oscillated.

In an example shown in FIG. 9D, a lid 710 of the bracket 70 has an outer wall 73o provided at an outer peripheral side of the lid 71o. The outer wall 73o protrudes downward outside of the sub-tank 30 when the bracket 70 is assembled to the sub-tank 30. An inner peripheral surface of the outer wall 73o is separated from the outer peripheral surface of the sub-tank 30 by a separation distance CL3. In this example, the upper opening portion 32 of the sub-tank 30 may be separated from the lower surface of the lid 710 by a distance larger than the separation distance CL3. Even when the structure described above is adopted, the oscillation of the pump assembly 40 is restricted from being transmitted to the sub-tank 30 through the lid 71o, and the dynamic seal can be performed so as to restrict the splash of the fuel when the fuel is oscillated. A lid of the bracket 70 may include both the inside wall 73i arranged separately from an inner side of the sub-tank 30 and the outer wall 73o arranged separately from the outer side of the sub-tank 30.

Assembly of the lid member 90 and the sub-tank 30 will be described below. The lid member 90 is assembled to the sub-tank 30 by a guide part 110. As shown in FIGS. 1 and 10A, a guide rod 120 which has long length is attached to the lid member 90. One guide rod 120 is shown in FIGS. 1 and 10A, however, two guide rods 120 are actually provided on the lid member 90 at two positions, respectively. That is, the guide parts 110 are provided at two positions. The guide part 110 includes the guide rod 120 attached to the lid member 90 and a guide groove 130 which is provided at the sub-tank 30 and receives the guide rod 120.

Figure 10B:
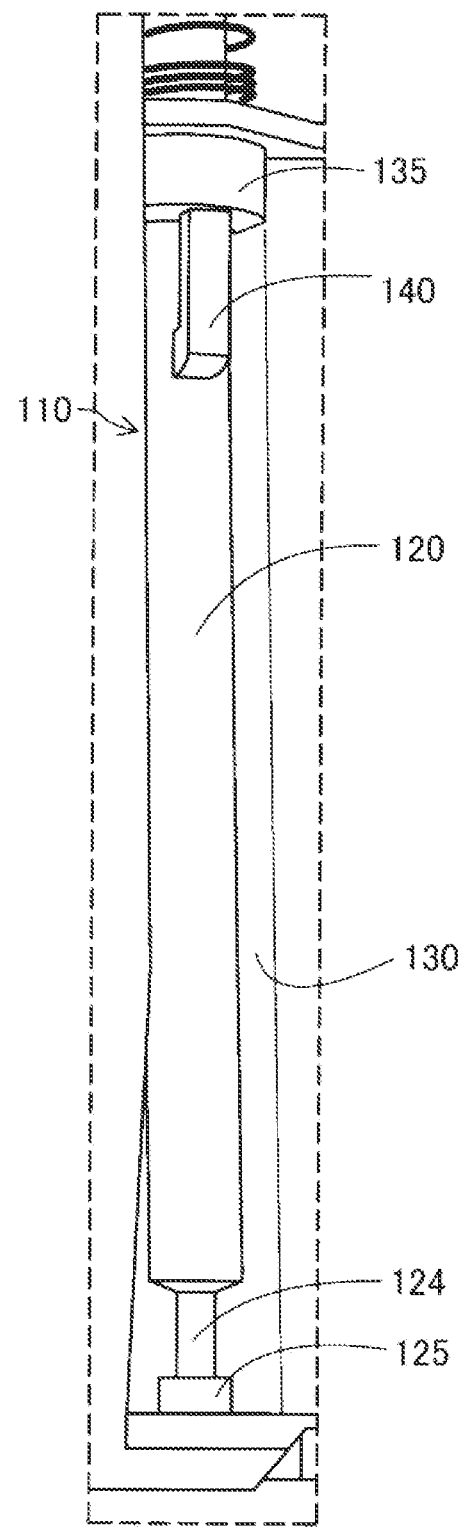
FIG. 10B is an enlarged view showing a part BB of the guide part.

As illustrated, the guide groove 130 is formed along the height direction of the sub-tank 30. A guide rod introduction portion 135 which has an arc form is formed at a middle part of the guide groove 130. The guide rod introduction portion 135 circularly connects side walls of the guide groove 130. The guide rod 120 is inserted into the guide rod introduction portion 135 from the upper side. As shown in FIG. 10B, a throttle portion 124 is provided at an end of the guide rod 120, and an end portion 125 is provided at an end side of the throttle portion 124. The end portion 125 has an outer diameter larger than that of the throttle portion 124. The guide rod 120 is inserted to the guide rod introduction portion 135 from the upper side and housed in the guide groove 130. In FIG. 10B, the guide rod 120 is housed in the guide groove 130.

A stopper 140 extends from a bottom of the guide rod introduction portion 135 downward. A structure of an end portion of the stopper 140 will be described below. The stopper 140 has a lower end, and a radially inner side of the lower end of the stopper 140 is positioned on an inner side of an outer peripheral surface of the guide rod 120 in a radial direction. When the guide rod 120 is inserted along the guide groove 130 from the upper side, the stopper 140 is elastically deformed outward in the radial direction. The guide rod 120 is moved upward or downward along the guide groove 130 while the end of the stopper 140 abuts against the outer peripheral surface of the guide rod 120. When the guide rod 120 is inserted, the stopper 140 is elastically deformed outward in the radial direction by the end portion 125 and a main body of the guide rod 120. Therefore, insertion of the guide rod 120 is not obstructed by the stopper 140. The fuel supply device 100 is used in a situation that the throttle portion 124 is positioned lower than the stopper 140. When the lid member 90 is moved upward from the above state in order to be withdrawn from the sub-tank 30, the throttle portion 124 of the guide rod 120 reaches the stopper 140. At this point, the stopper 140 returns inward in the radial direction from the elastically deformed state. When the end of the stopper 140 abuts against the end portion 125, the guide rod 120 is not moved furthermore. In order to further move the guide rod 120, the stopper 140 is required to be withdrawn from the throttle portion 124 manually.

The stopper 140 is provided as described above. When the fuel supply device 100 is equipped in the fuel tank 20, the end of the stopper 140 abuts against the outer peripheral surface of the guide rod 120 at an upper side (facing to the lid member 90) of the throttle portion 124. Because of this, when the fuel tank 20 expands or shrinks, the guide rod 120 is moved upward or downward. Each time of the movement, the end of the stopper 140 is rubbed with the outer peripheral surface of the guide rod 120. Therefore, the end of the stopper 140 may be abraded by the reciprocation of the guide rod 120.

Figure 10C:
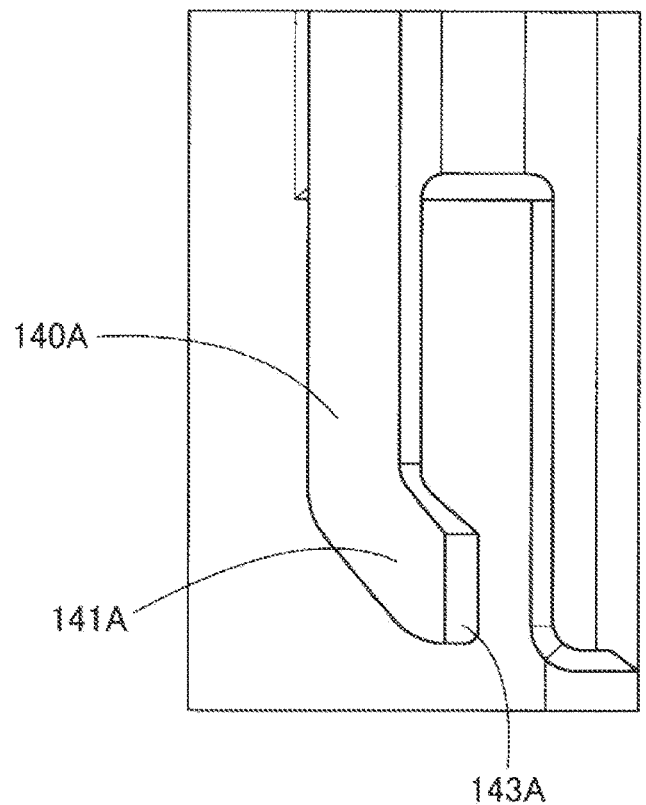
FIG. 10C is an explanatory view showing a shape of a known stopper.
Figure 10D:
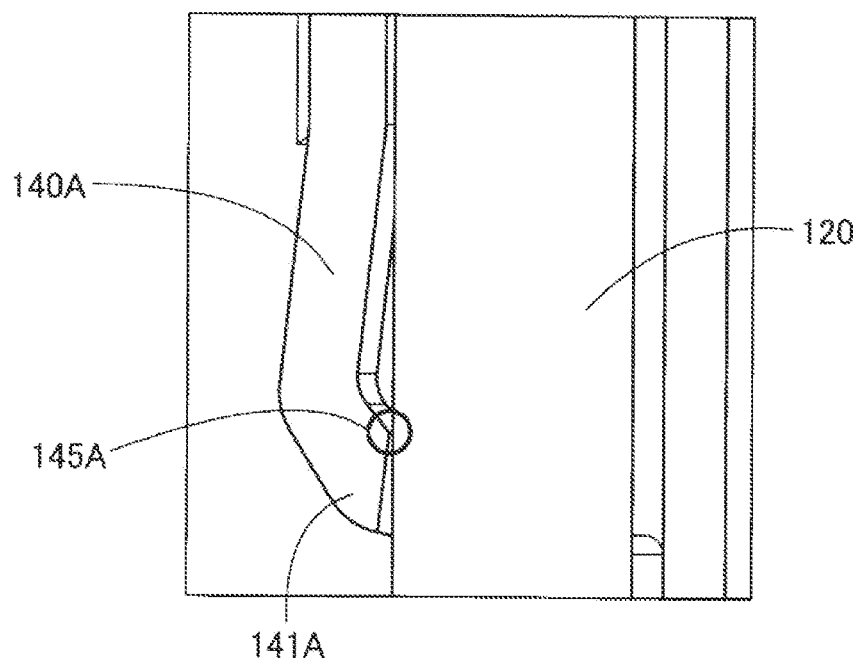
FIG. 10D is an explanatory view showing the known stopper in contact with a guide rod.

The above will be described referring to FIGS. 10C and 10D showing conventional techniques in more detail. FIGS. 10C and 10D show a conventional stopper 140A viewed from the inner side closer to the guide rod 120. The stopper 140A includes an end part 141A which slightly protrudes inward. A side end surface 143A of the end part 141A is formed parallel to the outer peripheral surface of the guide rod 120. Because of this, as shown in FIG. 10D, when the stopper 140A is elastically deformed outward after the guide rod 120 is inserted to the guide groove 130, the end part 141A is directed slightly downward. Therefore, the side end surface 143A inclines and is brought into contact with the outer peripheral surface of the guide rod 120 only at an edge 145A of the end part 141A of the stopper 140A. That is, a contact between the stopper 140A and the outer peripheral surface of the guide rod 120 is a line contact. In addition, the guide rod 120 has a columnar shape. Therefore, a width of the line contact is confined to a small range. When the guide rod 120 is moved along the guide groove 130, the edge 145A of the end part 141A is rubbed with the outer peripheral surface of the guide rod 120, such that the edge 145A tends to be abraded. When the end part 141A of the stopper 140 is worn out by abrasion, the end part 141A of the stopper 140 is not in contact with the end portion 125 of the guide rod 120 and may not function as a stopper.

Figure 11A:
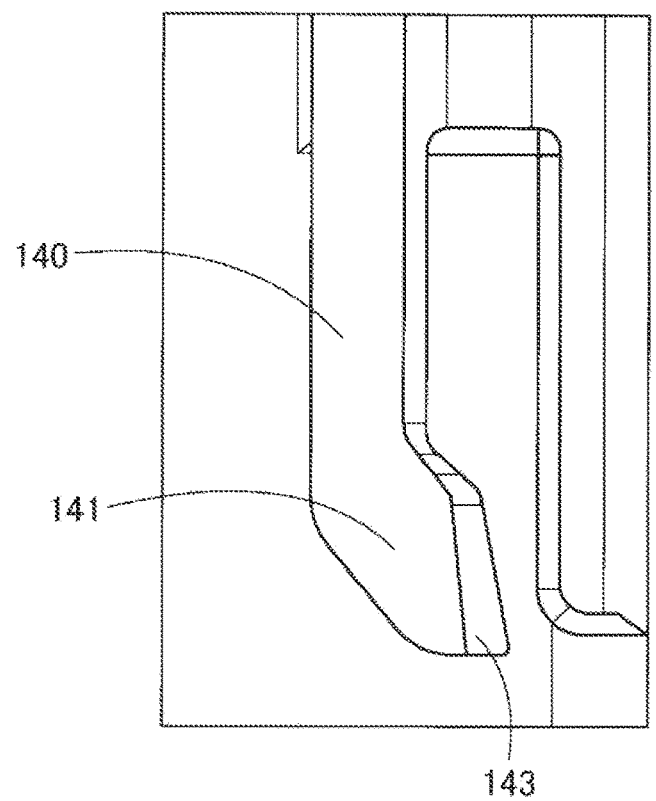
FIG. 11A is an explanatory view showing a shape of a stopper according to an embodiment.
Figure 11B:
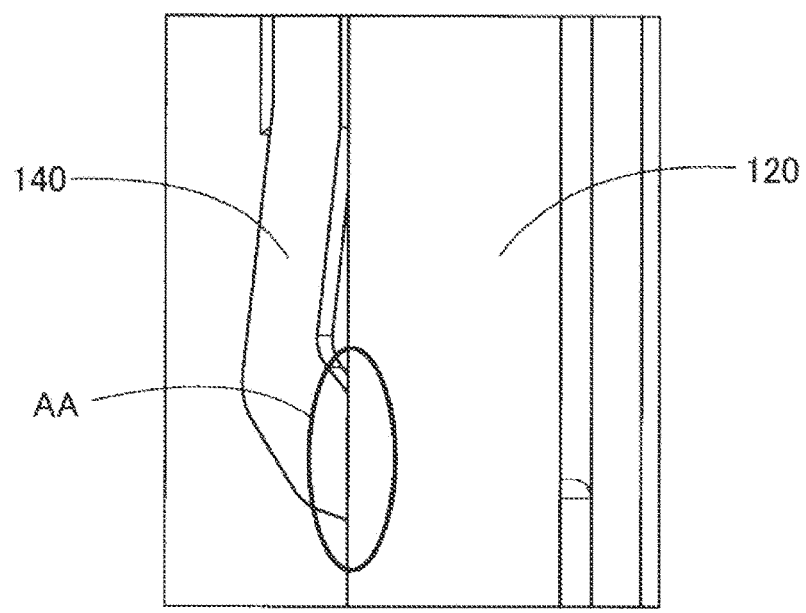
FIG. 11B is an explanatory view showing the stopper in contact with a guide rod according to the embodiment.

Therefore, in this embodiment, as shown in FIGS. 11A and 11B, an end part 141 of the stopper 140 includes a side end surface 143 which is a slope slightly inclined upward in the original shape. An inclination angle of the slope corresponds to magnitude of an elastic deformation of the stopper 140 caused by insertion of the guide rod 120. Because of this, as shown by an enclosed area AA in FIG. 11B, when the end part 141 of the stopper 140 is elastically deformed outward, the whole of the side end surface 143 is in contact with the outer peripheral surface of the guide rod 120. Therefore, the end of the stopper 140 is protected from the abrasion caused by move of the guide rod 120.

Figure 12A:
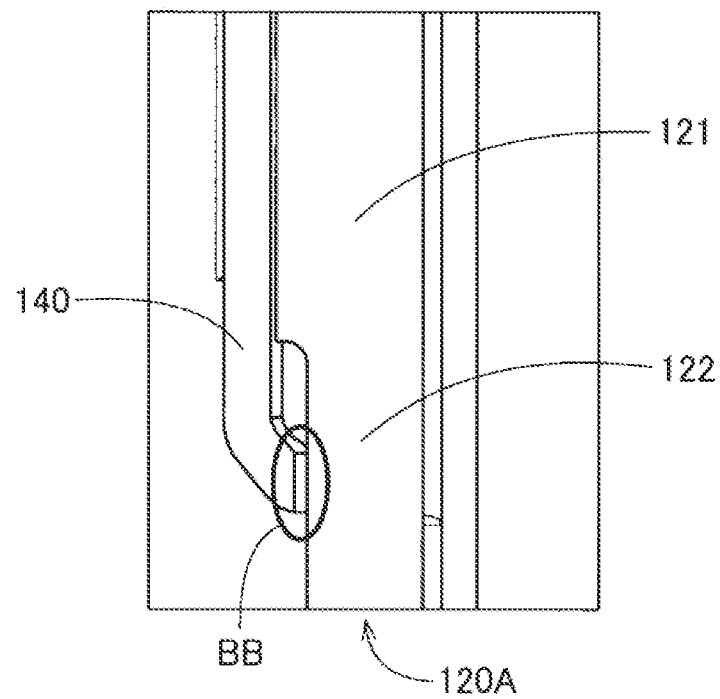
FIG. 12A is an explanatory view showing a shape of a stopper part and a guide rod according to another embodiment.
Figure 12B:
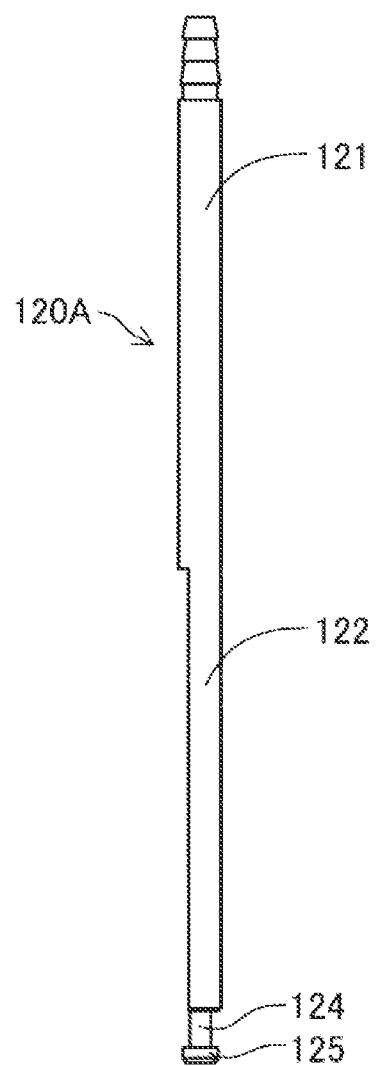
FIG. 12B is a view showing a shape of the guide rod according to another embodiment.

Instead of the above formation of the stopper 140, as shown in FIGS. 12A and 12B, a shape of the guide rod 120 may be changed to protect the stopper 140 from the abrasion. In this example, a reduction portion 122 is provided in an approximately half of the guide rod 120A at a side closer to the end portion 125. The reduction portion 122 is formed by reducing an outer periphery of the guide rod 120A by cutting. The guide rod 120A has a columnar portion 121, similarly to the guide rod 120, provided in the upper half of the guide rod 120A. That is, as shown by an enclosed area BB in FIG. 12A, when the guide rod 120A is housed in the guide groove 130, the end of the stopper 140 is opposed to the reduction portion 122 and is not in contact with an outer peripheral surface of the guide rod 120A. Therefore, when the guide rod 120A is moved, the end of the stopper 140 is protected from the abrasion. In addition, similarly to the first embodiment, the end portion 125 is hit to the stopper 140 when the guide rod 120A is pulled upward, such that an unexpected detachment of the guide rod 120A is restricted.

A structure of the relief valve 50 adopted in this embodiment will be described below. As shown in FIGS. 2 and 3, the relief valve 50 is arranged around a middle point in a height direction of the pump assembly 40 at the outer side of the pump assembly 40. The relief valve 50 is configured to release a pressure by opening, when back pressure of the suction jet pump 60 driven by discharged fuel gets higher than a predetermined pressure value due to a pressure regulation performed by the regulator 47.

Prior to description of the relief valve 50, a passage for the fuel discharged by the electric pump 41 will be described. FIG. 8 is a partial sectional view showing a passage defined in the pump assembly 40. A discharge port 42 of the electric pump 41 is connected to the passage 83. One outlet of the passage 83 is the discharge port 86. As described above, the flexible tube 52 is connected to the discharge port 86, and the fuel is transferred to the discharge port 92 of the lid member 90 through the flexible tube 52.

The passage 83 at an opposite side of the discharge port 86 is connected to the regulator 47. The regulator 47 is configured to regulate pressure in the passage 83 in a predetermined range. Due to pressure regulation by the regulator 47, pressure of the fuel discharged from the discharge port 92 is kept in a predetermined range.

A fuel passage 49 is connected to a discharge side of the regulator 47, and the relief valve 50 is arranged at one outlet of the fuel passage 49. The other end of the fuel passage 49 is connected to the suction jet pump 60 through a passage provided in the connection part 55. The fuel discharged by the regulator 47 after receiving pressure control is spouted from a suction nozzle 61 of the suction jet pump 60. By negative pressure caused by the spouting, the fuel is drawn from an unillustrated opening of the sub-tank 30 at the bottom of the sub-tank 30. The electric pump 41 pressurizes the drawn fuel as described above and discharges from the discharge port 92 to an unillustrated fuel injection valve arranged in the internal combustion engine at the outside. On the other hand, as shown in FIG. 8, the fuel flowing toward the transfer jet pump 62 through the branch path 63 is spouted from a transfer nozzle 64. By negative pressure caused by the spouting, the fuel in the fuel tank 20 at a side in which the fuel supply device 100 is not provided is transferred into the sub-tank 30. The above fuel is transferred into the sub-tank 30 through the transfer pipe 35. A cap 69 is arranged on a position upper than the transfer jet pump 62 and is configured to restrict the fuel spouted from the transfer nozzle 64 upward from being discharged to an outside of the sub-tank 30. The cap 69 may be separated from the transfer jet pump 62, or may be formed integrally.

Figure 13A:
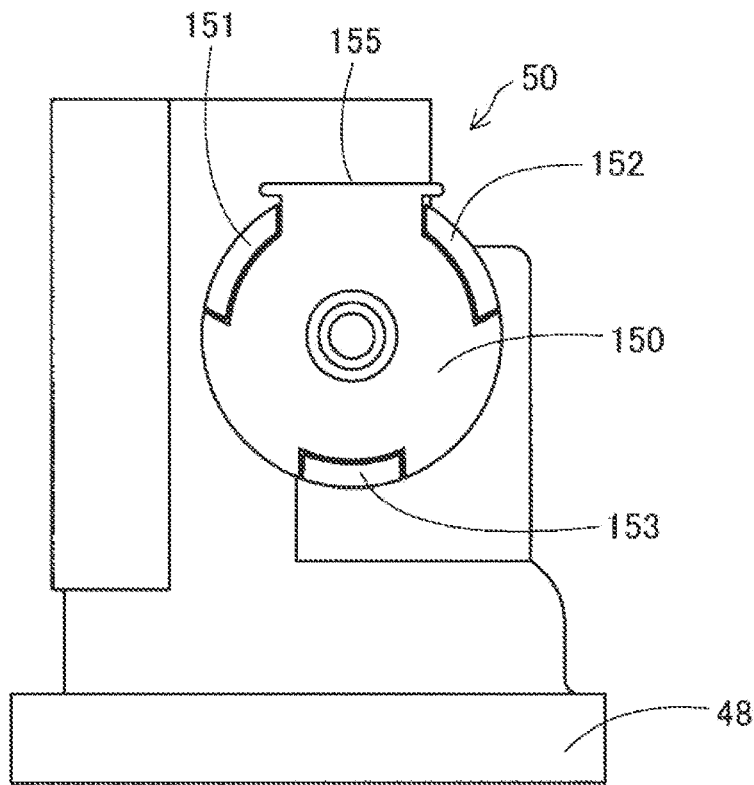
FIG. 13A is a front view showing a relief valve.
Figure 13B:
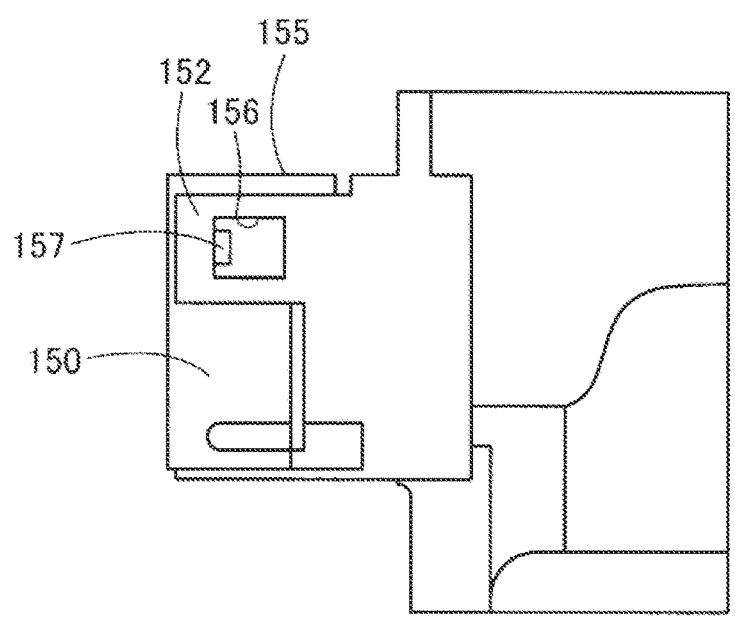
FIG. 13B is a side view showing the relief valve.
Figure 14:
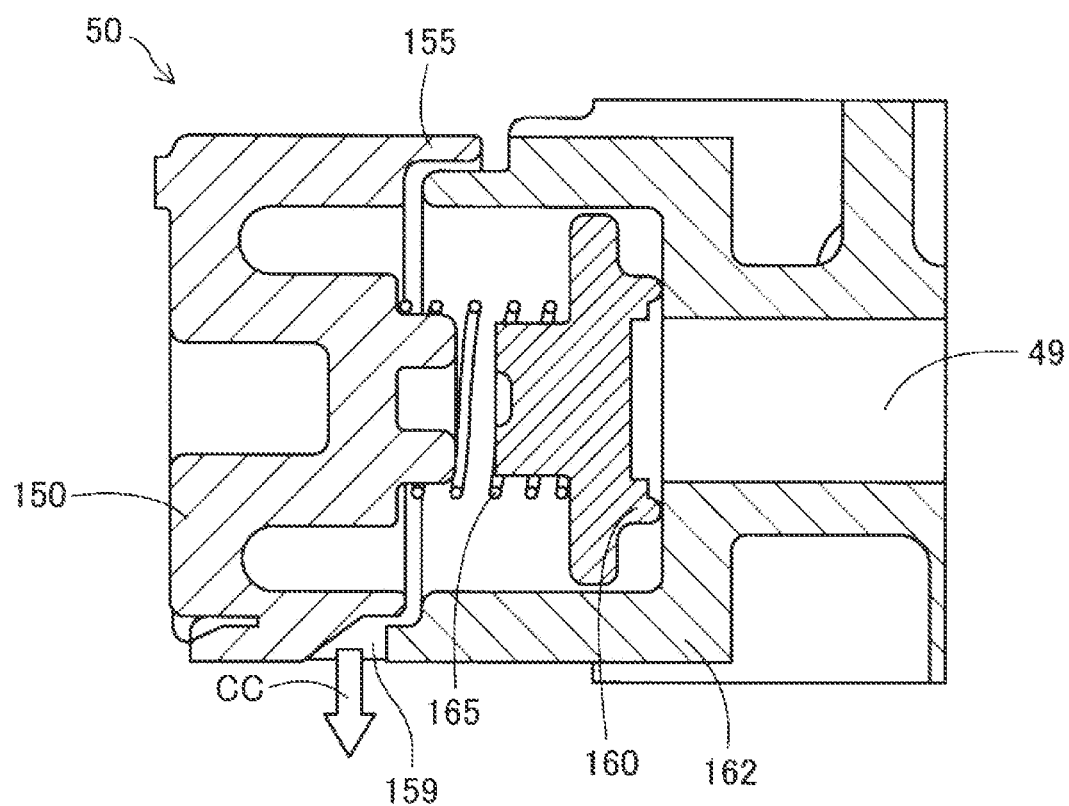
FIG. 14 is a sectional view showing the relief valve.

As described above, the regulator 47 is configured to regulate the pressure of the discharged fuel, and the relief valve 50 is configured to regulate the back pressure of the suction jet pump 60 driven by the fuel discharged after regulating pressure, or the like. FIGS. 13A and 13B show an appearance of the relief valve 50, and FIG. 14 is a sectional view showing an internal structure of the relief valve 50. The relief valve 50 includes a valve body 160, a storage body 162, a cap 150, and a spring 165. The storage body 162 houses the valve body 160. The cap 150 is fitted in and assembled to the storage body 162. The storage body 162 includes an internal space communicated to an outlet of the fuel passage 49. The valve body 160 is housed in the internal space and configured to close the outlet of the fuel passage 49 by being biased by the spring 165. One end of the spring 165 is fixed to the cap 150 which includes a spring seat.

The relief valve 50 is constructed such that the cap 150 is attached to the storage body 162 from the outside. As shown in FIG. 13A, the cap 150 includes three recesses at an outer peripheral surface. The cap 150 is attached such that fitting parts 151, 152, 153 which protrude outward from the storage body 162 are fitted to the recesses. As shown in FIG. 13B, the fitting parts 151, 152, 153 each includes an opening part 156, and a protrusion 157 is provided in the recess of the cap 150. When the cap 150 is attached, the fitting parts 151, 152, 153 are elastically deformed outward and get over the protrusion 157. Once the cap 150 is attached, the protrusion 157 is hit to an end of the opening part 156, and the detachment of the cap 150 is restricted. In addition, in the above state, the spring 165 is compressed between the spring seat of the cap 150 and the valve body 160, and a state in which the protrusion 157 abuts against the opening part 156 is kept.

A flange 155 is arranged at an upper part of the cap 150, and a clearance 159 is provided at a lower part of the cap 150. Therefore, when the pressure of the fuel in the fuel passage 49 gets higher, and the fuel is leaked to a side of the relief valve 50 by movement of the valve body 160, the fuel is not leaked to a side closer to the flange 155. The fuel is leaked from the clearance 159 in an arrow direction CC, that is, in a gravity direction. The leaked fuel just returns to the bottom of the sub-tank 30 and is treated as the fuel stored in the sub-tank 30.

In the first embodiment, as described above, the relief valve 50 can be assembled easily by attaching the cap 150 to the storage body 162. Therefore, the manufacturing method becomes easier compared to a previous structure manufactured by using heat welding or heat caulking. Furthermore, the fuel is released downward, and the fuel is restricted from the leakage. In addition to the fitting of the protrusion 157 and the opening part 156, an outer peripheral surface of the cap 150 may be connected to an inner peripheral surface of the storage body 162 by pressure.

A filter arranged at a lower part of the pump assembly 40 and adopted in the embodiment will be described below. As shown in FIGS. 2 and 3, the integrated filter 45 is provided at the lower part of the pump assembly 40. In this embodiment, the integrated filter 45 is integrated with the filter at the downstream of the electric pump 41, and a whole filter is arranged at the bottom of the electric pump 41. On the other hand, conventionally, a filter is also arranged at a side of an electric pump in order to secure a filtration area only at an upstream side. The integrated filter 45 is configured to filter the fuel sucked by the electric pump 41 and to capture foreign substances even when fine powder such as dust or rust is mixed in the fuel in the fuel tank 20. Therefore, the integrated filter 45 restricts the foreign substances from being sucked into the electric pump 41 and protects the fuel discharged toward the fuel injection valve or the like from being mixed with the foreign substances.

Figure 15:
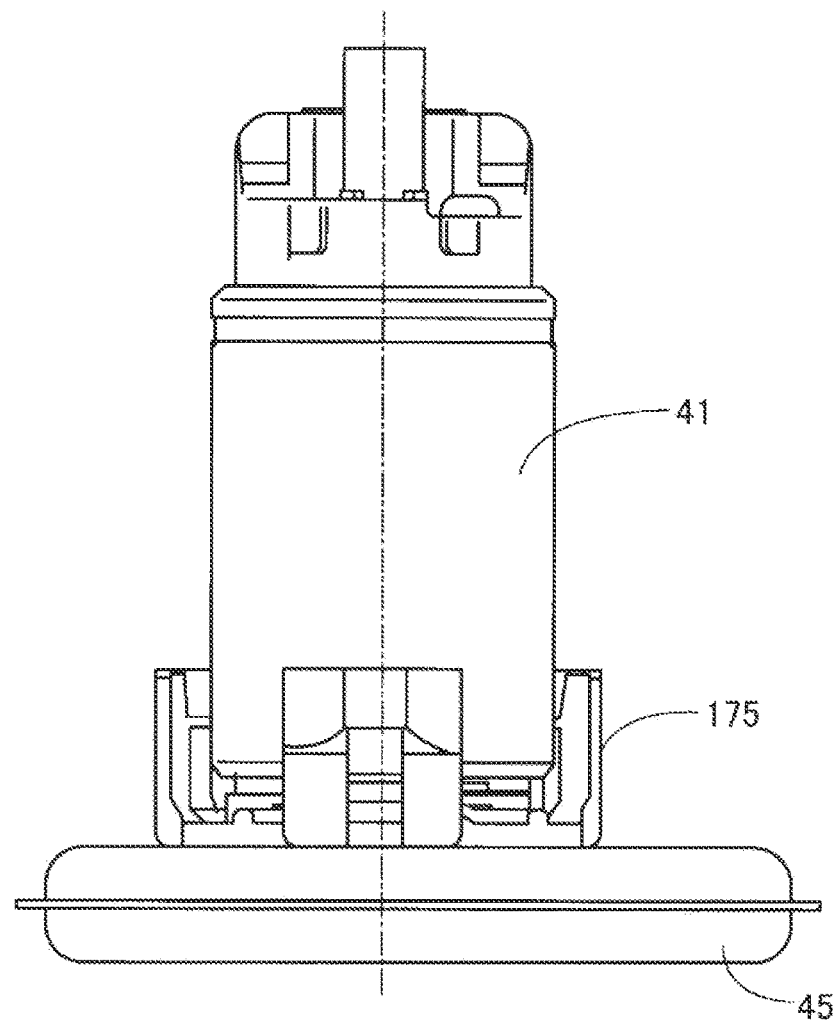
FIG. 15 is an explanatory view showing the electric pump and an integrated filter assembled to each other.
Figure 16:
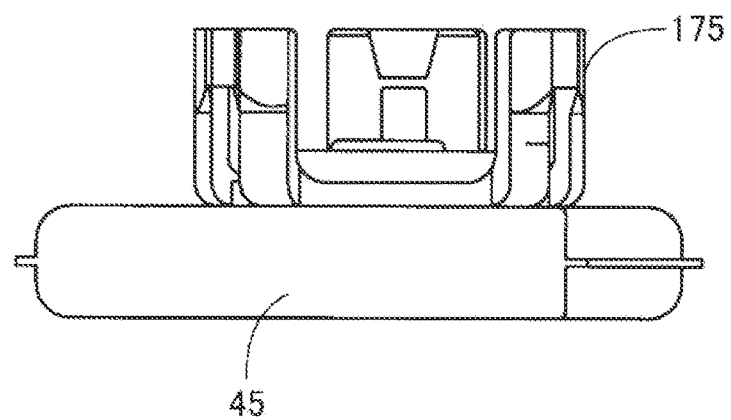
FIG. 16 is an explanatory view showing a shape of a filter holder.

FIG. 15 shows a relationship between the pump assembly 40 and the integrated filter 45. As shown in FIG. 15, a filter holder 175 is attached at the lower part of the pump assembly 40. As shown in FIG. 16, the filter holder 175 is integrated with the integrated filter 45. The integrated filter 45 has a disk shape partially cut and does not abut on the bottom of the sub-tank 30 at the inner side when the bracket 70 is fitted to the sub-tank 30. Therefore, the integrated filter 45 is protected from the abrasion caused by the friction with the bottom of the sub-tank 30 at the inner side. The filter holder 175 includes a flame which protrudes upward and is attached to the bottom of the electric pump 41 directly.

Figure 17:
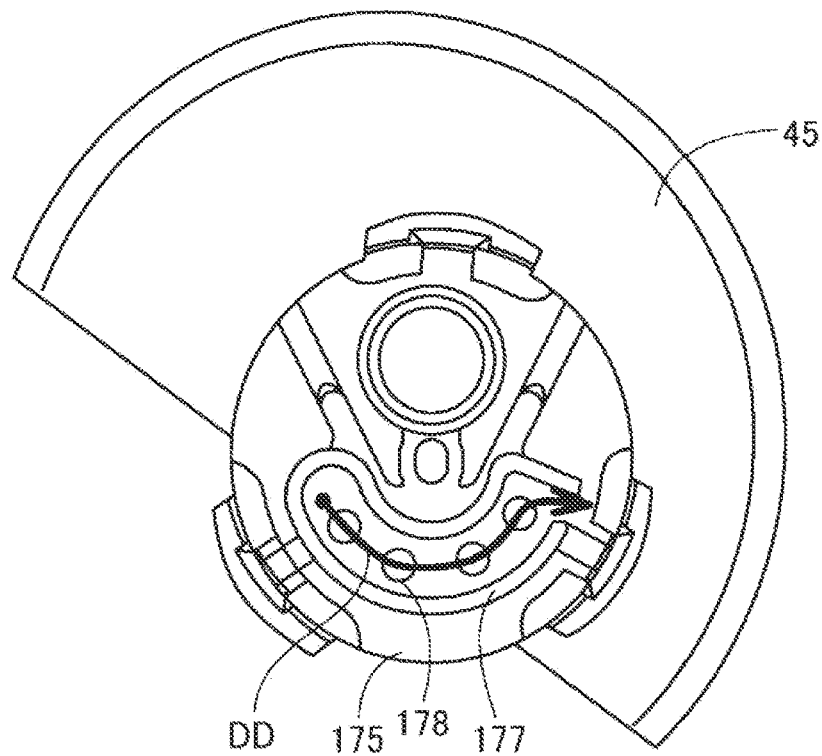
FIG. 17 is an explanatory view showing a bottom shape of the filter holder.
Figure 18:
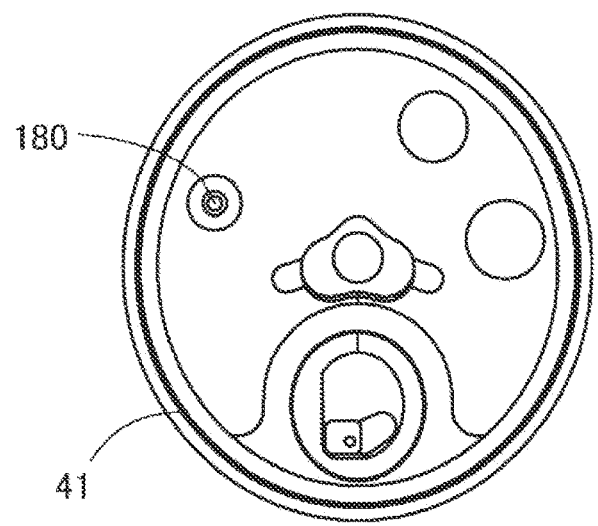
FIG. 18 is an explanatory view showing a shape of an undersurface of the electric pump.

As shown in FIG. 17 showing the filter holder 175 and the integrated filter 45 viewed from an upper side, a partition 177 is arranged at an inner side of the filter holder 175. An inside of the partition 177 is provided as a vapor passage. Multiple branch passages 178 are opened at a bottom of the vapor passage surrounded by the partition 177, and the integrated filter 45 is exposed downward from the branch passage 178. As shown in FIG. 18, a vapor discharge hole 180 through which vapor fuel is discharged is provided at a bottom of the electric pump 41. Vapor fuel discharged from the vapor discharge hole 180 passes through the multiple branch passages 178 from an inside of the partition 177 as shown by an arrow DD. Because of this, the vapor fuel is brought into contact with a large area of the integrated filter 45 at a predetermined flow rate or higher. Therefore, the dust, the foreign substance, or the like attached to a surface of the integrated filter 45 are removed. As a result, progress of clogging of the integrated filter 45 is restricted, and lifetime of the integrated filter 45 is extended. In this embodiment, the integrated filter 45 is provided intensively at the lower part of the pump assembly 40 and is not provided around a side surface of the pump assembly 40. Because of this, an outer diameter of the sub-tank 30 is small, and the integrated filter 45 is densified. Therefore, washing of the integrated filter 45 so as to remove the dust or the like by a blowout of the vapor fuel is useful. In this embodiment, all of the integrated filter 45 is housed at the lower part of the pump assembly 40, and a filter is not provided at a side upper than a fuel suction port positioned at a bottom of the electric pump 41 normally. Therefore, vapor lock is restricted. The vapor lock is a phenomenon such that air flowing backward from the electric pump 41 is accumulated when the electric pump 41 stopped, and the electric pump 41 does not suck in the fuel due to inhalation of the accumulated air when the electric pump 41 operates.

B. Second Embodiment

Figure 19:
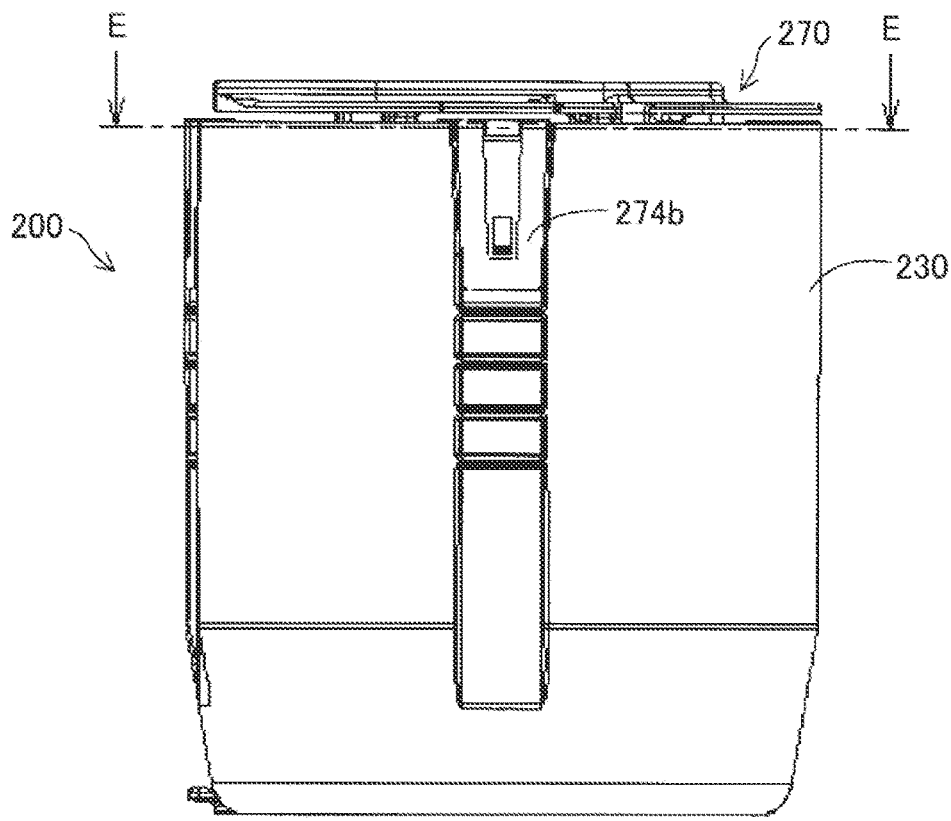
FIG. 19 is a front view showing a sub-tank and a bracket of a fuel supply device according to a second embodiment.

A fuel supply device 200 in a second embodiment will be described below. FIGS. 19 to 23 show a structure of the fuel supply device 200 and a bracket 270 used in the fuel supply device 200. As shown in FIG. 19, in the fuel supply device 200, the bracket 270 is attached to an upper opening portion of a sub-tank 230. The sub-tank 230 houses the pump assembly 40 similar to the first embodiment. A member corresponding to the lid member 90 in the first embodiment is not shown in FIG. 19.

Figure 20:
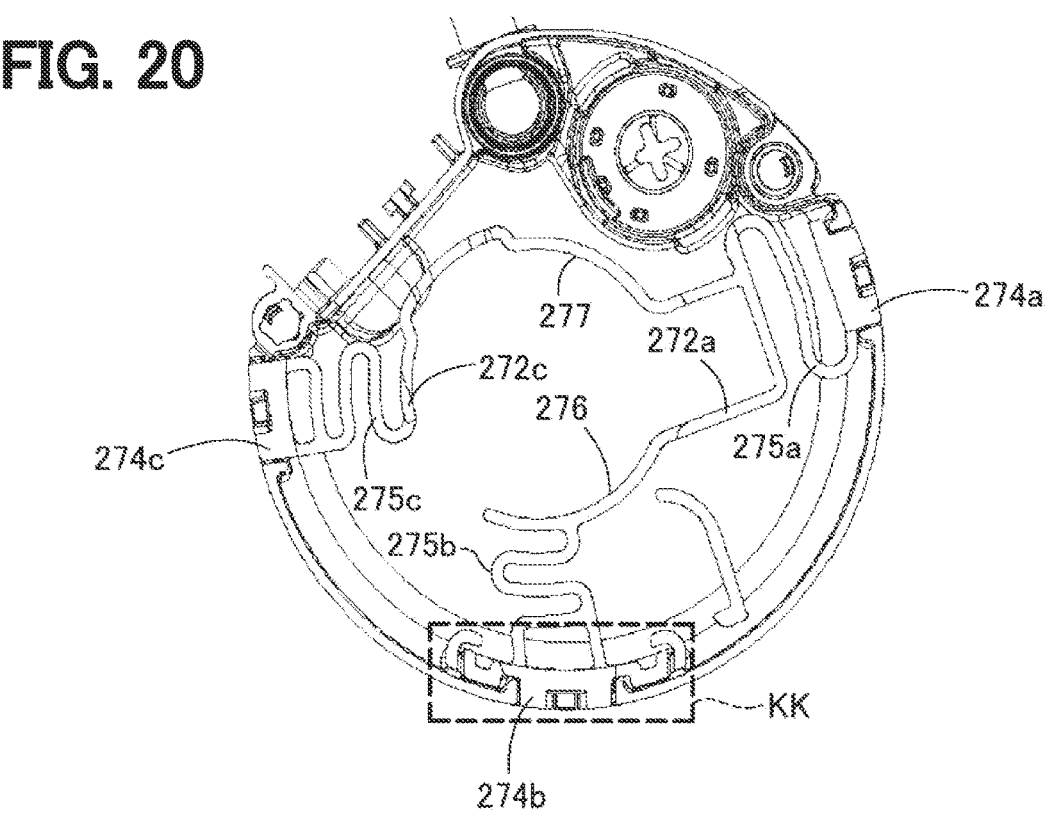
FIG. 20 is an end view viewed along an arrow E-E in FIG. 19.
Figure 21:
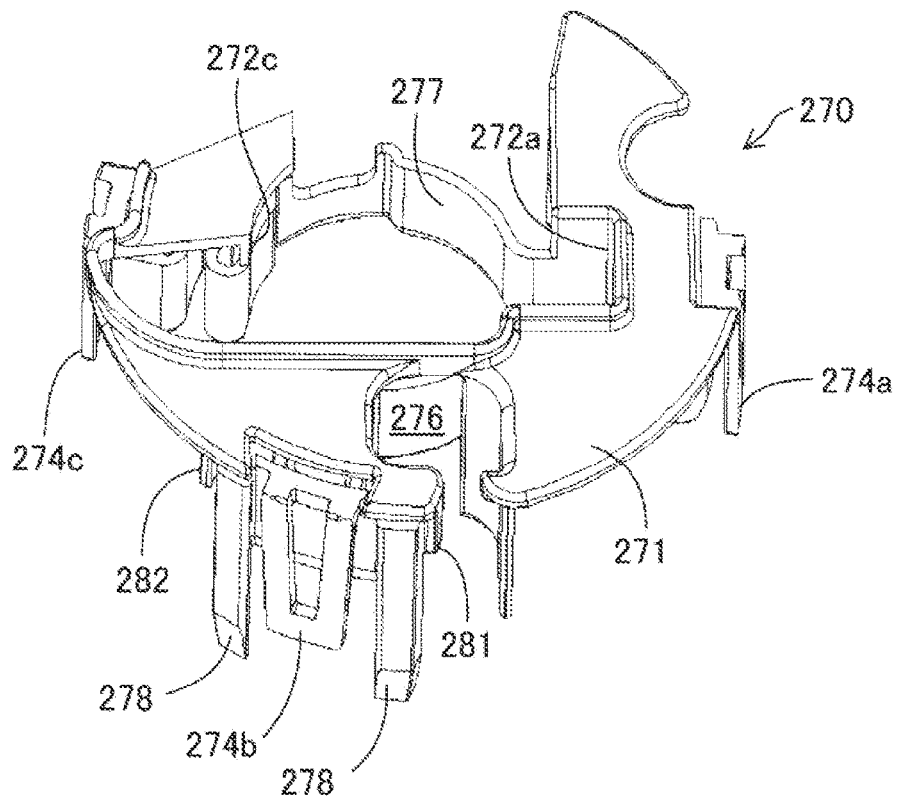
FIG. 21 is a perspective view showing a shape of the bracket according to the second embodiment.

As shown in FIGS. 20 and 21, similarly to the bracket 70 in the first embodiment, the bracket 270 in the second embodiment includes a lid 271, three fitting portions 274a, 274b, 274c, and three damping portions 275a, 275b, 275c. The bracket 270 further includes holding arms 276, 277 which hold the holder portion 44 of the pump assembly 40.

Figure 22:
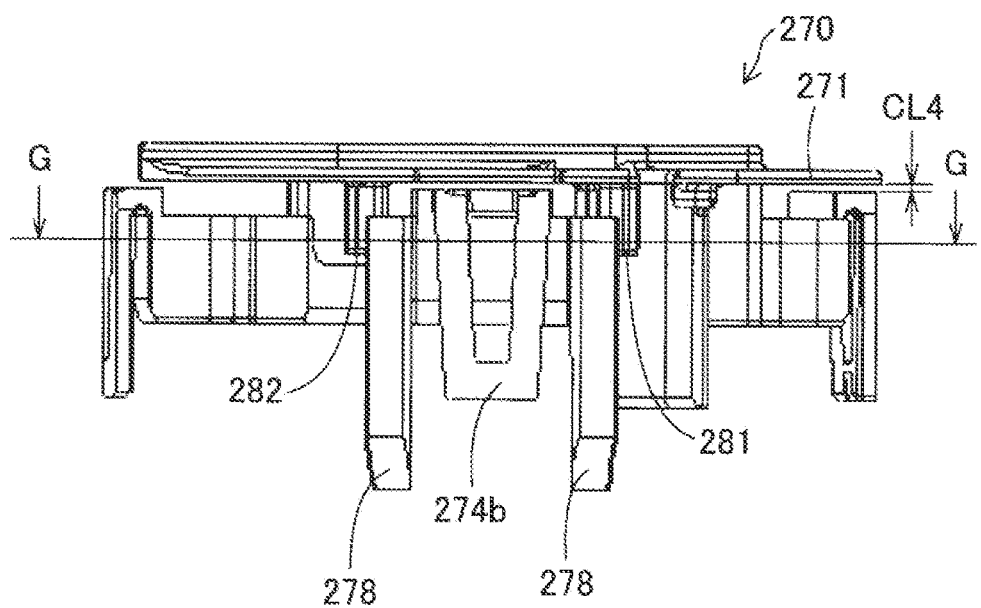
FIG. 22 is a side view showing the bracket.

FIG. 20 shows members such as the fitting portion 274a in a state that the bracket 270 is cut once at a middle in a thickness direction of the bracket 270. FIG. 20 is a view of an end surface viewed along an arrow G-G in FIG. 22. As shown in FIGS. 20 to 22, unlike the bracket 70 in the first embodiment, in the bracket 270 in the second embodiment, the damping portions 275a, 275c are arranged between standing portions 272a, 272c and the fitting portions 274a, 274c, respectively. In addition, the fitting portion 274b is directly connected to the damping portion 275b. Therefore, the oscillation caused by the electric pump 41 of the pump assembly 40 is transmitted from the holding arm 276, 277 to the lid 271 through the standing portion 272a, 272c. However, similarly to the first embodiment, a separation distance CL4 (with reference to FIG. 22) is provided between the lid 271 and the sub-tank 230. Therefore, the oscillation of the electric pump 41 is not transmitted from the lid 271 to the sub-tank 230. On the other hand, the fitting portion 274a, 274b, 274c is fitted to the sub-tank 230. In this state, the oscillation is damped by the damping portion 275a, 275b, 275c and is hardly transmitted to the fitting portion 274a, 274b, 274c. As a result, in the second embodiment, the oscillation of the electric pump 41 is hardly transmitted to the sub-tank 230.

Figure 23:
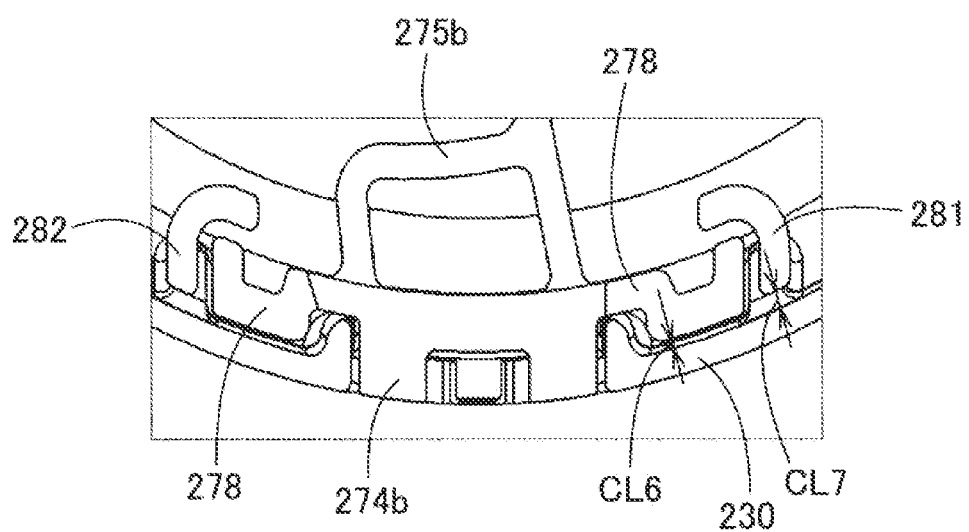
FIG. 23 is an enlarged view showing an area KK in FIG. 20.

As described above, in the second embodiment, the oscillation is damped by the damping portions 275a, 275b, 275c joined to the fitting portions 274a, 274b, 274c. In this case, a member corresponding to the standing portion is not provided at a side of the fitting portion 274b. Therefore, the fitting portion 274b may be moved in a circumferential direction of the bracket 270. However, regulating members 281, 282 are provided downward from the lid 271 at both sides of the fitting portion 274b. FIG. 23 shows an enlarged view of an area KK in FIG. 20. As shown in FIG. 23, two guide portions 278 are provided at the both sides of the fitting portion 274b. The regulating member 281, 282 is provided at the further outer side of the guide portions 278 so as to surround the guide portion 278 from an outer side in the circumferential direction and an inner side in a radial direction. In addition, the regulating member 281, 282 is not in contact with the guide portion 278.

When the bracket 270 in the second embodiment is attached to the sub-tank 230, similarly to the first embodiment, a position of the bracket 270 with respect to the sub-tank 230 is set by using the guide portion 278. At this point, the position of the fitting portion 274 relative to the sub-tank 230 is easily set since a position of the fitting portion 274b is regulated by the regulating members 281, 282, in addition to positions of the fitting portions 274a, 274c. As shown in FIG. 23, the guide portion 278 is separated from the sub-tank 230 by a separation distance CL6, and the regulating members 281, 282 are separated from the sub-tank 230 by a separation distance CL7. Therefore, members which formed directly from the lid 271 is not contacted directly to the sub-tank 230 and does not transmit the oscillation.

Similarly to the first embodiment, the separation distance between the lid 271 and the upper opening portion of the sub-tank 230 is secured in the second embodiment. Therefore, as described above, the transmission of the oscillation caused by the electric pump 41 of the pump assembly 40 can be restricted enough, and the dynamic seal is performed so as to restrict the splash of the fuel when the fuel is oscillated.

C. Variations of the Embodiments

In the embodiments described above, the suction jet pump 60 is separated from the transfer jet pump 62 or the pump assembly 40. However, at least one part of the above members may be integrally formed with another members. In addition, the regulator 47 and the relief valve 50 are integrated into the pump assembly 40 in the above embodiments, however, at least one of the above members may be formed separately. The storage body 43 is separated from the filter holder 175 in the above embodiments, however, the storage body 43 and the filter holder 175 may be integrally formed.

A number of the damping portions is three in the above embodiment, however, may be two or more than four. In addition, a number of the fitting portions or the receiving portions may be two or more than four and is not limited to three. Similarly, a number of the guide portions may be three or more.

In the embodiment described above, the lid 71, 271 is separated from the upper opening portion 32 of the sub-tank 30, 230. As shown in FIGS. 9B to 9D, a direction in which the lid 71, 271 is separated from the upper opening portion 32 may be the vertical direction, the radial direction, or two direction including the vertical direction and the radial direction. As long as the lid 71, 271 is not in contact with the sub-tank 30, 230 to which the bracket 70 supporting the electric pump 41 is attached, for example, the upper opening portion 32 of the sub-tank 30, 230 may extend to a position higher than the lid 71, 272. In the above embodiment, the resonance frequency of the component to support the electric pump 41 is between the third oscillation frequency and the eighth oscillation frequency of the motor of the electric pump 41. However, the resonance frequency of the component to support the electric pump 41 may be set above the eighth oscillation frequency.

The guide portion 78 which guides the fitting portion 74a, 74b, 74c of the bracket 70 when the fitting portion 74a, 74b, 74c is fitted to the receiving portion 34a, 34b, 34c may not be provided. In addition, the guide portion 78 may not be provided at all of the fitting portions and may be provided at a limited number of portions such as one fitting portion. The guide portion 78 may be separated from the fitting portion 74a, 74b, 74c.

D. Other Embodiments

[1] According to the present disclosure, a fuel supply device includes: a sub-tank to be fixed on a bottom of a fuel tank, the sub-tank temporarily storing fuel in the fuel tank, an upper side of the sub-tank having an opening; a bracket attached to the opening side of the sub-tank; an electric pump that pumps up fuel in the sub-tank and supplies the fuel to outside of the sub-tank; and multiple fitting portions arranged on an outer edge of the bracket and to fix the bracket to the sub-tank by being fitted to multiple receiving portions arranged on the opening of the sub-tank. The bracket has a lid covering the opening with a predetermined separation distance from the opening of the sub-tank when the bracket is attached to the opening of the sub-tank, a fixing portion that fixes the electric pump, and multiple damping portions having predetermined damping characteristics, the damping portion being provided between the fixing portion and the fitting portion.

[2] In the fuel supply device described above, the damping portions may be set to have damping coefficients, respectively, such that the resonance frequency of the component which fixes the electric pump to the bracket is between the third oscillation frequency accompanied by the rotation of the electric pump and the eighth oscillation frequency of the electric pump. Because of this, the resonance of the third oscillation frequency and the eighth oscillation frequency which may cause a problem to the electric pump can be restricted, and the oscillation can be restricted.

[3] In the fuel supply device described above, the damping portion may be placed between the fixing portion and the lid, and the multiple fitting portions may be connected to each other through the lid. In addition, the multiple fitting portion may be connected to the lid through the damping portion. Because of the structure described above, the transmission of the oscillation between the fixing portion and the lid can be restricted easily. In addition, in the above fuel supply device, the bracket may include multiple guide portions configured to guide the fitting portion when the fitting portion is fitted into the receiving portion, and the guide portions may be connected to each other through the lid. Because of the guide portion, the attachment of the bracket can be easier.

[4] In the fuel supply device described above, the lid may include a guide part. The guide part includes a guide rod which protrudes from the lid by a predetermined length through the bracket and a guide groove of the sub-tank which houses the guide rod. The guide part may be structured as below. A guide rod introduction portion which has an arc form is provided at the guide groove and receives the guide rod. A stopper is arranged at the radially inner side of the guide rod introduction portion. The stopper is biased toward the guide rod and is enabled to deform elastically in a direction opposite to the direction in which the stopper is biased. An end side surface of the stopper is formed parallel to an outer peripheral surface of the guide rod when the stopper is biased to the outer peripheral surface of the guide rod. An engagement part is provided at an end side of the guide rod and is configured to restrict the guide rod from being withdrawn by being engaged with the stopper. Because of this, locations can be determined easily when the lid is attached to the sub-tank. The engagement part is formed at an end of the guide rod. Therefore, when the guide rod is drawn out from the guide groove, the engagement part engages with the stopper and is configured to restrict unexpected detachment between the sub-tank and the lid. In addition, an end surface of the stopper is paralleled to the outer peripheral surface of the guide rod. Therefore, the end of the stopper is protected from the abrasion caused by the move of the guide rod.

[5] The fuel supply device may be structured as below. The lid includes the guide part. The guide part includes the guide rod which protrudes from the lid by a predetermined length through the bracket and the guide groove which is provided on the sub-tank and houses the guide rod. The guide rod introduction portion which has an arc form is provided at the guide groove and receives the guide rod. The stopper is arranged at the radially inner side of the guide rod introduction portion. The stopper is biased toward the guide rod and is enabled to deform elastically in the direction opposite to the direction in which the stopper is biased. The engagement part is provided at the end side of the guide rod and is configured to restrict the guide rod from being withdrawn by being engaged with the stopper. In addition, an outer shape of the guide rod is formed such that at least a part of the guide rod is not in contact with the end of the stopper biased toward the guide rod at an upper side of the engagement part. As a result, the unexpected detachment of the sub-tank and the lid can be restricted by the engagement part and the stopper. In addition, the stopper is protected from the abrasion, because of the area in which the end of the stopper is not in contact to the outer peripheral surface of the guide rod even when the guide rod moves.

The engagement part may have a form which includes the end portion which has a diameter larger than that of the throttle portion at the end of the guide rod through the throttle portion. In addition, the engagement part may have a form which includes an E-ring inserted into the end of the guide rod.

[6] The fuel supply device described above may be structured as below. The bracket includes a deformation portion deformed elastically in a same fitting direction in which the fitting portion is fitted when the fitting portion is fitted into the receiving portion. A connection part which includes the fuel passage of the electric pump is pressed on a function part stored in the sub-tank to circulate the fuel by the elastic deformation of the deformation portion. Therefore, a fuel passage of the connection part is connected to a fuel passage of the function part. In addition, a direct connection between the deformation portion and the connection part is released by elastic recovery of the deformation portion. Because of the structure described above, the connection part and the function part can be connected each other in the sub-tank. Additionally, the lid and the connection part are not connected directly after the connection, and the oscillation from the electric pump is not transmitted to the lid through the connection part.

[7] The fuel supply device described above may be structured as below. A flexible tube connects a discharge port through which the electric pump discharges the fuel to an inlet of a passage through which the fuel flows to the outside. The inlet is provided on the lid. The bracket includes a housing portion which has a diameter larger than an external diameter of the flexible tube. The housing portion includes an opening which has a diameter smaller than the external diameter of the flexible tube. The flexible tube is enabled to pass through the opening by the elastic deformation. Because of the above structure, the fuel discharged from the discharge port of the electric pump toward the inlet of the passage at the lid passes through the flexible tube and flows to the outside. Therefore, the oscillation of the electric pump is restricted from being transmitted. In addition, the flexible tube is housed in the housing portion of the bracket. Therefore, handling of the assembly can be facilitated while the flexible tube is used.

[8] The fuel supply device described above may be structured as below. A low pressure discharge passage is branched from a discharge side passage through which the fuel is discharged from the electric pump. A relief valve is provided at the low pressure discharge passage and includes a valve body and a spring. The valve body seals the low pressure discharge passage. The spring sets a relief pressure of the relief valve. In the relief valve, the valve body is fixed by a member fitted in and assembled so as to be pressed in a direction of sealing by the spring. Thus, the assembly of the relief valve can be facilitated.

[9] The fuel supply device described above may be structured as below. In the sub-tank, a filter is provided under the electric pump. The electric pump includes a bubble discharge hole at a position opposed to the filter. Bubbles mixed in the fuel drawn from the sub-tank are discharged from the bubble discharge hole at the bottom of the electric pump. Thus, dust attached to the filter can be removed by the fuel discharged with the bubbles from the bubble discharge hole of the electric pump.

The present disclosure is not limited by the embodiments or structure described above. The present disclosure encompasses various variations and modifications within equivalents. For example, technical features in each of embodiments corresponding to technical features in the summary can be replaced or be combined where appropriate to solve all of or a part of the issues described above or to achieve all of or a part of the effect described above. In addition, technical features can be excluded where appropriate if the technical features are not described as necessarily essential.

What is claimed is:

1. A fuel supply device to be arranged on a bottom of a fuel tank comprising:
    a sub-tank to be fixed on the bottom of the fuel tank, the sub-tank temporarily storing fuel in the fuel tank, an upper side of the sub-tank having an opening;
    a bracket attached to an opening side of the sub-tank;
    an electric pump that pumps up the fuel in the sub-tank and supplies the fuel to outside of the sub-tank; and
    a plurality of fitting portions arranged on an outer edge of the bracket and to fix the bracket to the sub-tank by being fitted to a plurality of receiving portions arranged on the opening of the sub-tank, wherein
    the bracket has
        a lid covering the opening with a predetermined separation distance from the opening of the sub-tank when the bracket is attached to the opening of the sub-tank,
        a fixing portion that fixes the electric pump,
        a plurality of damping portions having predetermined damping characteristics, the damping portion being provided between the fixing portion and the fitting portions, and
        the plurality of damping portions are set to have damping coefficients, respectively, such that a resonance frequency of a component to fix the electric pump to the bracket is between a third oscillation frequency accompanied by a rotation of the electric pump and an eighth oscillation frequency of the electric pump.

2. The fuel supply device according to claim 1, wherein the damping portion is placed between the fixing portion and the lid, and
    the plurality of fitting portions are connected to each other through the lid.

3. The fuel supply device according to claim 1, wherein the bracket includes a plurality of guide portions guiding the fitting portion when the fitting portion is fitted into the receiving portion, and the guide portions are connected to each other through the lid.

4. The fuel supply device according to claim 1, wherein the bracket includes a deformation portion deformed elastically in a same fitting direction in which the fitting portion is fitted when the fitting portion is fitted into the receiving portion,
    a connection part including a fuel passage of the electric pump is pressed on a function part stored in the sub-tank to circulate the fuel by an elastic deformation of the deformation portion, such that the fuel passage of the connection part is connected to a fuel passage of the function part, and
    a direct connection between the deformation portion and the connection part is released by restoration of the deformation portion which has been deformed elastically.

5. The fuel supply device according to claim 1, wherein the plurality of fitting portion are connected to the lid through the damping portion.

* * * * *